(12) United States Patent
Otsuka

(10) Patent No.: US 11,954,059 B2
(45) Date of Patent: Apr. 9, 2024

(54) SIGNAL PROCESSING CHIP AND SIGNAL PROCESSING SYSTEM

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 184 days.

(21) Appl. No.: 17/627,899

(22) PCT Filed: Oct. 5, 2020

(86) PCT No.: PCT/JP2020/037782
§ 371 (c)(1),
(2) Date: Jan. 18, 2022

(87) PCT Pub. No.: WO2021/075302
PCT Pub. Date: Apr. 22, 2021

(65) Prior Publication Data
US 2022/0261370 A1    Aug. 18, 2022

(30) Foreign Application Priority Data

Oct. 15, 2019   (JP) ................................ 2019-189027

(51) Int. Cl.
*G06F 13/42*    (2006.01)
*G06F 13/40*    (2006.01)

(52) U.S. Cl.
CPC ............................... *G06F 13/4068* (2013.01)

(58) Field of Classification Search
CPC ........ G06F 13/4068; G06F 9/38; G06F 13/38; G06F 13/42; G06F 15/167
See application file for complete search history.

(56) References Cited

U.S. PATENT DOCUMENTS

| 5,153,455 A | 10/1992 | Walters, Jr. |
| 5,600,650 A | 2/1997 | Oskouy |
| 6,683,817 B2 | 1/2004 | Wei |
| 8,103,806 B1 * | 1/2012 | Ain-Kedem ........... G11C 5/066 710/17 |
| 2003/0156454 A1 | 8/2003 | Wei |

(Continued)

FOREIGN PATENT DOCUMENTS

| JP | 5255945 A | 10/1993 |
| JP | 05265946 A | 10/1993 |

(Continued)

OTHER PUBLICATIONS

International Search Report for corresponding PCT Application No. PCT/JP2020/037782, 4 pages, dated Dec. 15, 2020.

*Primary Examiner* — Henry Tsai
*Assistant Examiner* — Kim T Huynh
(74) *Attorney, Agent, or Firm* — Matthew B. Dernier, Esq.

(57) ABSTRACT

A signal processing chip includes a plurality of signal processing blocks each configured to transmit and receive a signal via a signal line, samples the signal on the signal line that is transmitted and received by the signal processing blocks, and transmits, to another signal processing chip, a data frame including information indicating the signal sampled at a timing of satisfying a predetermined condition.

18 Claims, 34 Drawing Sheets

(56) References Cited

U.S. PATENT DOCUMENTS

2004/0250002 A1* 12/2004 Hellberg ............... G06F 1/1632
  710/72
2011/0254603 A1* 10/2011 Kamath .................... H03L 7/00
  327/158
2015/0084672 A1* 3/2015 Oh ................. H03K 19/017545
  326/30
2015/0378955 A1* 12/2015 Amon ................. G06F 13/4226
  710/110
2018/0294999 A1* 10/2018 Giovannini ....... H04L 25/03057
2022/0261370 A1* 8/2022 Otsuka ................ G06F 13/4068
2022/0398391 A1* 12/2022 Song ................... G06Q 20/208

FOREIGN PATENT DOCUMENTS

| JP | 09128333 A | 5/1997 |
| JP | 09130402 A | 5/1997 |
| JP | 2005518600 A | 6/2005 |

\* cited by examiner

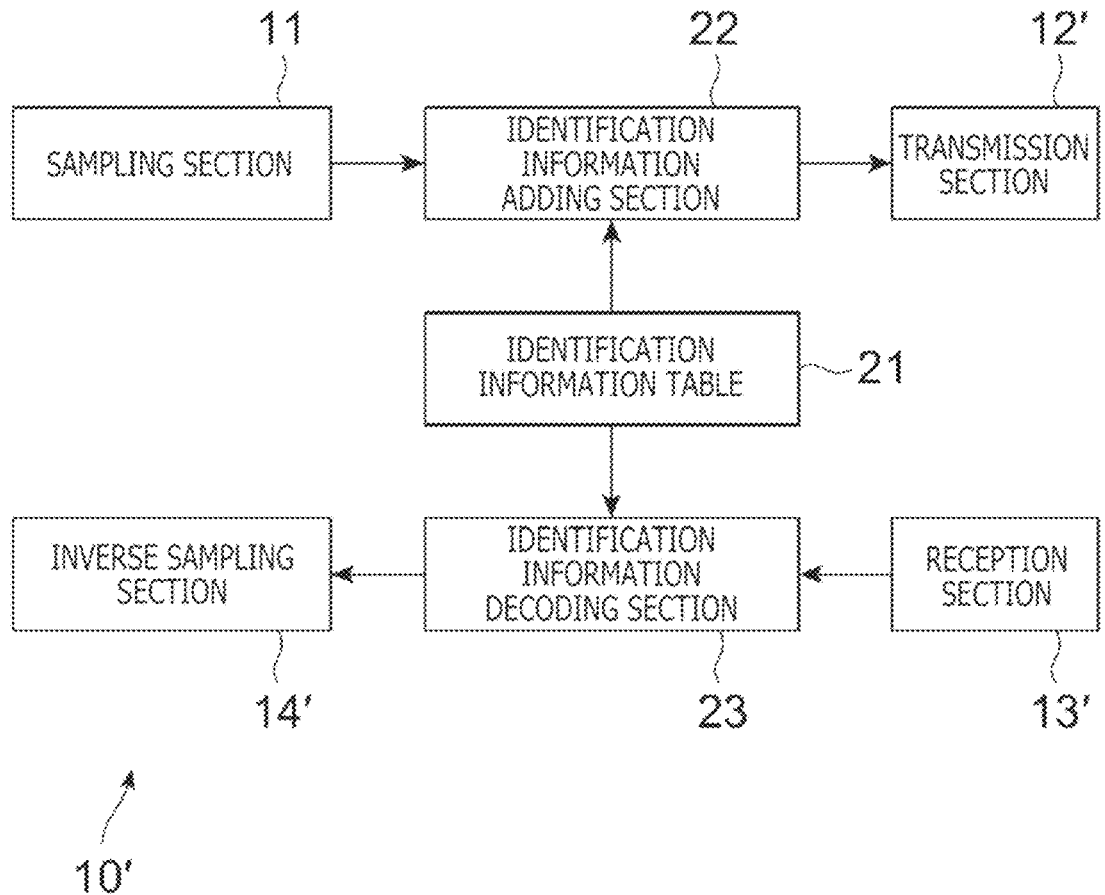

FIG.10

| ID | Src | Dst | Format | Freq | QoS | Burst |
|----|-----|-----|------------|------|-----|-------|
| 1  | A   | E   | Protocol X | N    |     |       |
| 2  | B   | D   | Protocol Y | M    |     |       |
|    |     |     |            |      |     |       |

AMBA AXI PROTOCOL
Channel Architectures

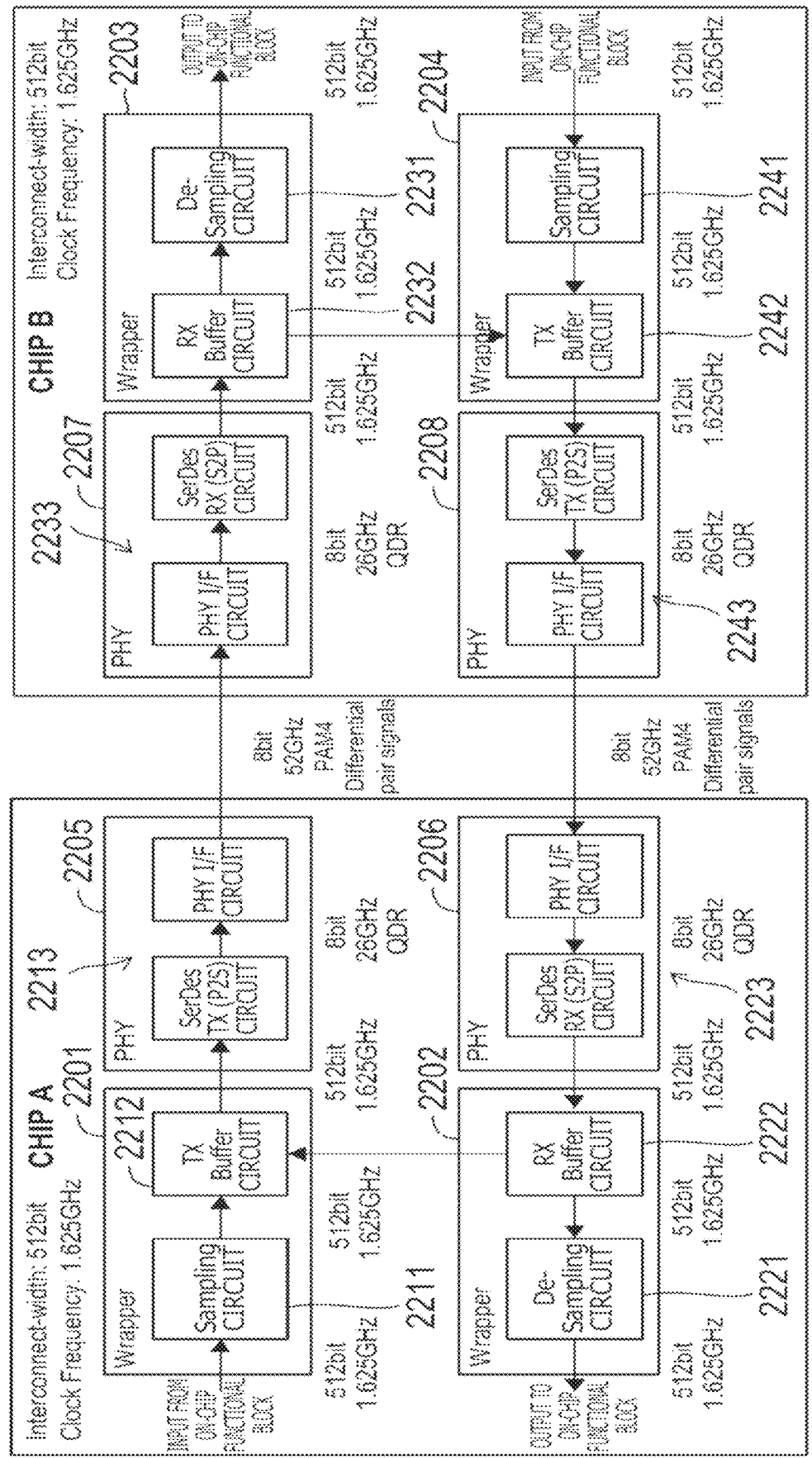
F I G. 2 2

FIG.24

| on-chip interconnect | Cycle 1 | Cycle 2 | Cycle 3 | Cycle 4 | Cycle 5 | Cycle 6 |
|---|---|---|---|---|---|---|
| a | active | active | active | active | non-active | active |
| b | non-active | non-active | non-active | non-active | non-active | non-active |
| c | non-active | active | non-active | non-active | non-active | non-active |
| d | active | active | active | active | active | active |

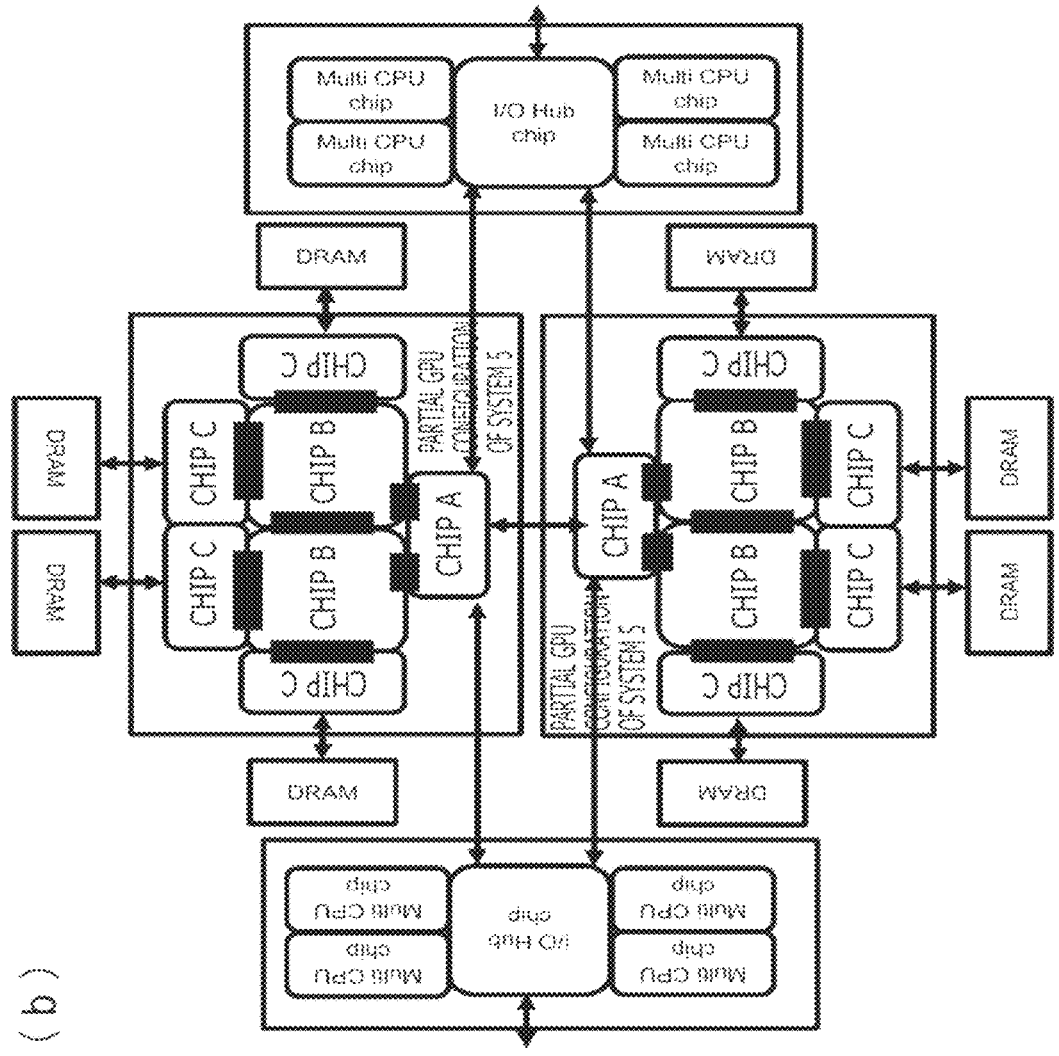
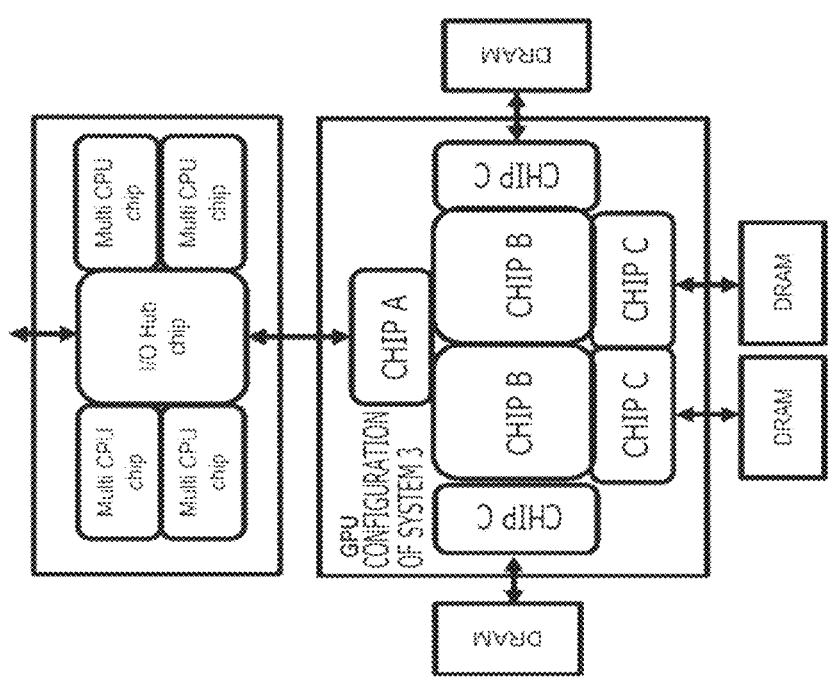
FIG. 33

FIG.37
(a) SYSTEM 3
(HOME CONSOLE) Pro CONFIGURATION
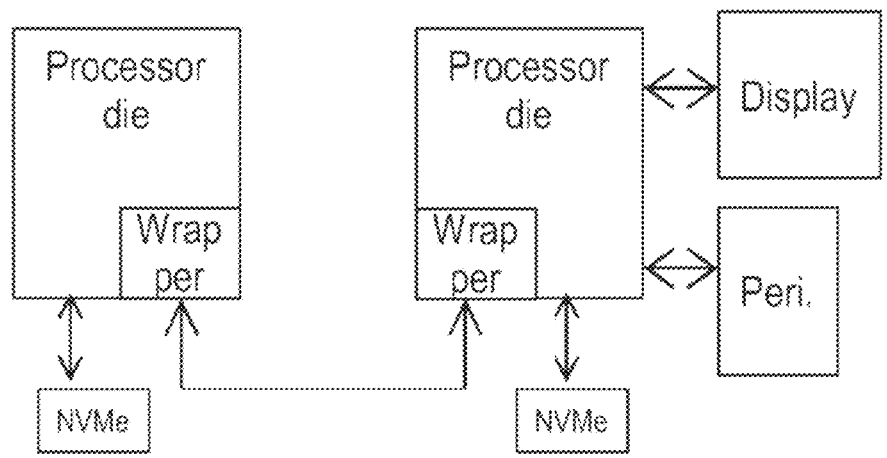
(b) SYSTEM 4
(SERVER Max 1 NODE CONFIGURATION)
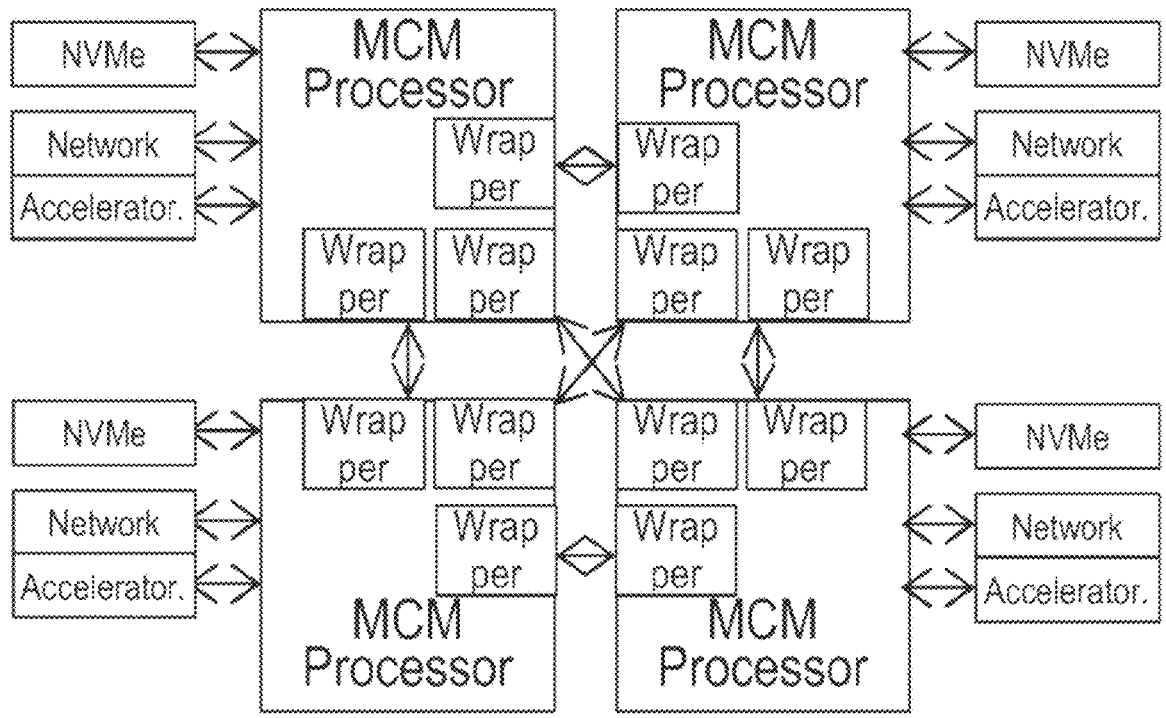

SIGNAL PROCESSING CHIP AND SIGNAL PROCESSING SYSTEM

TECHNICAL FIELD

The present invention relates to a signal processing chip and a signal processing system.

BACKGROUND ART

In recent years, the integration scale of integrated circuits configured to process various types of information has been increased, and it has become difficult to design the integrated circuits as single signal processing chips (single chips).

Meanwhile, there has been developed a technology that enables, by making chip-to-chip interconnection, a system including a large number of signal processing chips (multichip system), in which the plurality of signal processing chips are connected to each other, to perform signal processing.

In recent years, there have been developed interconnects that support multi-bit broadband signal communication with relatively low latency between the plurality of signal processing blocks included in a signal processing chip (on-chip interconnects). In a typical chip-to-chip interconnect, since chips are different from each other in signal electrical conditions and signal transmittable and receivable timing, a connection port circuit is provided in each chip, and signals in the chips are converted to communication signals with given protocols to be transmitted and received to and from the external chip.

SUMMARY

Technical Problems

However, in such a related-art chip-to-chip interconnect technology described above, the delay of signal processing such as protocol conversion or the queuing of data transmission and reception after protocol conversion is increased, with the result that the processing performance drops. Further, in a case where a protocol similar to a typical data communication protocol is employed, the overhead of information regarding what are generally called transport layer and data link layer is large, and the amount of transfer data is thus large.

The present invention has been made in view of the circumstance described above, and has an object to provide a signal processing chip capable of preventing an increase in amount of transfer data and reducing the delay of signal processing even in signal transmission and reception between a plurality of chips, and a signal processing system.

Solution to Problems

In order to solve the problems of the related-art example described above, a mode of the present invention includes a plurality of signal processing blocks each configured to transmit and receive a signal via a signal line; sampling means for sampling the signal on the signal line that is transmitted and received by the signal processing blocks; and transmission means for transmitting, to another signal processing chip, a data frame including information indicating the signal sampled at a timing of satisfying a predetermined condition.

Advantageous Effect of Invention

With this, an increase in amount of transfer data can be prevented and the delay of signal processing can be reduced even in signal transmission and reception between the plurality of chips.

BRIEF DESCRIPTION OF DRAWINGS

FIG. 7 is a block diagram illustrating another example of another wrapper section of the signal processing chip according to the embodiment of the present invention.

FIG. 8 is an explanatory diagram illustrating content examples of an identification information table included in an example of the signal processing chip according to the embodiment of the present invention.

FIG. 10 is an explanatory diagram illustrating content examples of an ID (Identification) table related to the embodiment of the present invention.

FIG. 22 is an explanatory diagram of a connection example of sections of the embodiment of the present invention.

FIG. 24 is an explanatory diagram illustrating examples of bus cycle transition of the signal processing chip according to the embodiment of the present invention.

FIG. 33 is another explanatory diagram illustrating an exemplary GPU configuration method of the embodiment of the present invention.

FIG. 37 is a still further explanatory diagram illustrating an exemplary GPU configuration method of the embodiment of the present invention.

DESCRIPTION OF EMBODIMENT

Figure 1:
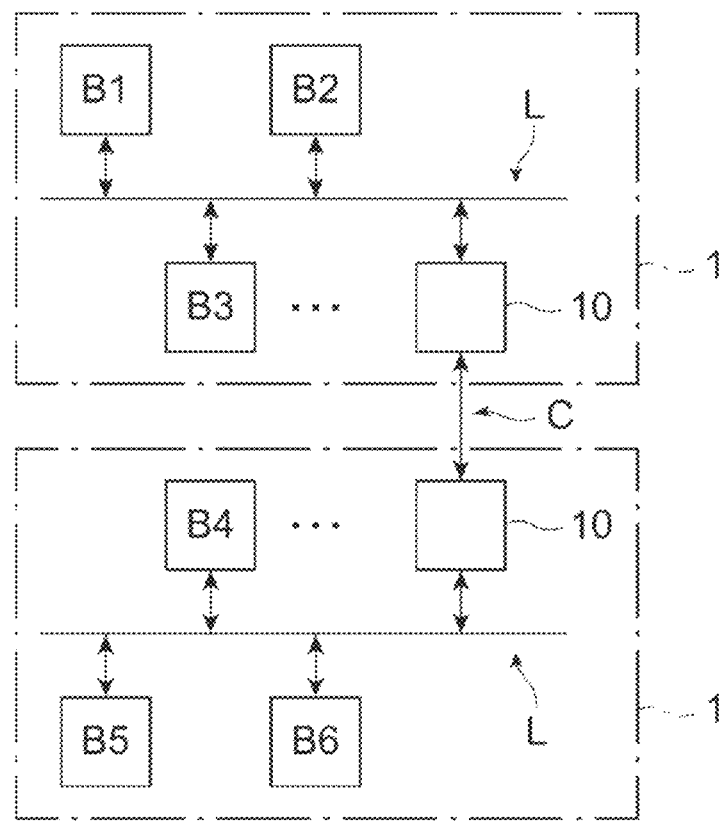
FIG. 1 is a block diagram illustrating configuration and connection examples of signal processing chips according to an example of an embodiment of the present invention.

An embodiment of the present invention is described with reference to the drawings. An example of a signal processing chip 1 according to the embodiment of the present invention includes, as exemplified in FIG. 1, a plurality of signal processing blocks B1, B2, etc., (hereinafter referred to as the "signal processing block B" unless they need to be distinguished from one another) and a wrapper section 10 that are connected to each other by a signal line L. Note that, in reality, the signal processing chip 1 includes various types of other wires such as a wire for suppling power to the sections, for example, but components required for description of the embodiment of the present invention are described for the sake of simple description of the embodiment of the present invention.

Here, the signal line L includes a data bus for transmitting and receiving data between the plurality of signal processing blocks B in the signal processing chip 1 including the data bus in question. A data bus generally includes a data signal line having a predetermined bit width, for transmitting digital signals (high (H) or low (L) signals) having a plurality of bits. Further, the signal line L may include, other than the data bus, a control signal line for allowing the plurality of signal processing blocks B to transmit control signals to each other.

Further, here, the signal processing blocks B include a control core, a register, a power management control section, and the like, and are communicably coupled to each other via the signal line L with use of respective given protocols (on-chip interconnect protocols).

Further, the wrapper section 10 is connected to the signal line L and communicably connected to the wrapper section 10 of another signal processing chip 1, which is located outside the signal processing chip 1, via a chip-to-chip interconnect C.

Here, the chip-to-chip interconnect C is a signal line that uses differential signals that operate with a narrow voltage amplitude, an equalizer or pre-emphasis function for the signal status-based optimization of voltage amplitude, 8b/10b or 128B/130B encoding, or the like, to thereby achieve a higher operating frequency than the signal line L in the chip and support broadband signal communication. However, this is not intended to limit the function of the chip-to-chip interconnect C. A signal line not satisfying such a condition may be used. For example, the chip-to-chip interconnect C may use single-ended signals instead of differential signals or function at a lower operating frequency than the signal line L, which is used as an on-chip interconnect. Examples of the signal line that can be used as such a chip-to-chip interconnect C are widely known, and hence a detailed description thereof is omitted herein.

Figure 2:
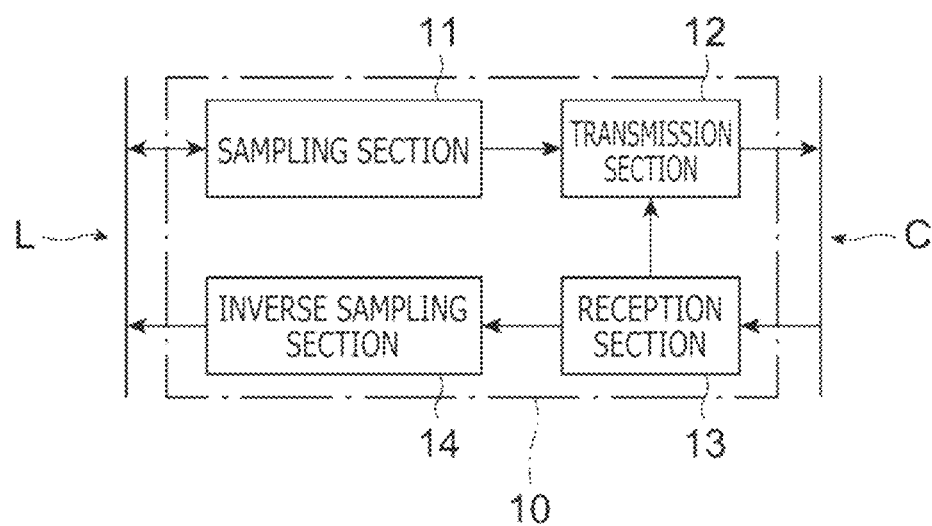
FIG. 2 is a block diagram illustrating an example of a wrapper section of the signal processing chip according to the embodiment of the present invention.

The wrapper section 10 includes, as exemplified in FIG. 2, which illustrates an example of the wrapper section 10, a sampling section 11, a transmission section 12, a reception section 13, and an inverse sampling section 14.

The sampling section 11 samples and outputs signals on the signal line L connected to the sampling section 11. In the present embodiment, information obtained by sampling signals (raw values) in the wire of the signal line L that transmits signals to be transmitted to another signal processing chip 1 (referred to as a "subject wire") (hereinafter referred to as a "data frame") is output.

In the present embodiment, the sampling section 11 samples raw values to perform sampling with a predetermined scheme irrespective of signal transmission and reception protocols on the signal line L, that is, on-chip interconnect protocols.

The transmission section 12 buffers data frames output from the sampling section 11 (including information regarding the sampled wires in the signal line L). Then, the transmission section 12 transmits the buffered data frames to another signal processing chip via the chip-to-chip interconnect C at a timing of satisfying a predetermined condition. This data frame transmission timing is described later.

Further, instead of parallelly transmitting data frames indicating the signals of the wires in transmission, the transmission section 12 may serially convert and transmit the data frames. With such serial conversion, the bit width of the chip-to-chip interconnect C can be reduced.

The reception section 13 receives data frames transmitted from another signal processing chip 1 via the interconnect C, buffers the data frames, and outputs the data frames to the inverse sampling section 14 at given timing. Specifically, the reception section 13 operates as one of the signal processing blocks B in the signal processing chip 1. When timing at which signals based on data frames temporarily held in the buffer can be output on the signal line L in the signal processing chip 1 comes, at this timing, the reception section 13 outputs the buffered data frames to the inverse sampling section 14 and deletes the data frames from the buffer (increases the free space).

Note that, in a case where data frames that have been transmitted from another signal processing chip 1 via the interconnect C are ones that have been serially converted, the reception section 13 converts this information to parallel data frames, thereby obtaining the information indicating the signals of the wires.

The transmission section 12 and the reception section 13 transmit and receive data frames by the predetermined communication scheme of the chip-to-chip interconnect C irrespective of on-chip interconnect protocols. As this communication scheme of the chip-to-chip interconnect C, as in the example already described, various communication schemes can be employed, such as the ones that use differential signals that operate with a relatively narrow voltage amplitude, an equalizer or pre-emphasis function for the signal status-based optimization of voltage amplitude, 8b/10b or 128B/130B encoding, or the like.

When data frames are output from the reception section 13, the inverse sampling section 14 reproduces, on the basis of the data frames, signals (raw values) in the connection line L in another signal processing chip serving as the transmission source of the data frames and connected via the chip-to-chip interconnect C, and outputs the reproduced signals to the wire corresponding to the subject wire of the signal line L connected to the inverse sampling section 14 in the self chip including the inverse sampling section 14 in question.

Here, timing at which the transmission section 12 transmits data frames is described. This timing may be a time point at which a given instruction is received from another signal processing chip 1 serving as a data frame transmission destination. Further, the transmission section 12 includes a first buffer BUF configured to hold, until this timing comes, data frames output from the sampling section 11.

Here, the given instruction may be a signal indicating that the reception section 13 is ready to receive (what is generally called credit flow control may be performed). In an example of the present embodiment, the reception section 13 includes a second buffer BUF configured to hold data frames transmitted from another signal processing chip 1 until timing at which the inverse sampling section 14 outputs signals to the signal line L comes. The reception section 13 outputs credit information indicating the increase or decrease of the free space of the second buffer BUF to the signal processing chip 1 serving as a data frame transmission source such that the other signal processing chip 1 can stop data frame transmission when the second buffer BUF is full.

Specifically, the reception section 13 obtains the increase or decrease value of the free space of its own second buffer BUF and instructs the transmission section 12 to transmit, as credit information, the increase or decrease value to the signal processing chip 1 connected via the chip-to-chip interconnect C.

This credit information is initially information regarding the number of transmissions that fills up the second buffer BUF. Note that, in this example, a data frame corresponding to the bit width of the chip-to-chip interconnect C is transmitted and received per transmission.

Further, when receiving credit information from another signal processing chip 1, the reception section 13 of the signal processing chip 1 outputs the credit information to the transmission section 12.

The transmission section 12 receives the input of the credit information and calculates the free space of the reception section 13 of the other signal processing chip 1 serving as a data frame transmission destination. Specifically, the transmission section 12 initially holds, in the storage section, information regarding the free space of the reception section 13 of the other signal processing chip 1 serving as a data frame transmission destination, and sets "0" by resetting.

Further, the transmission section 12 adds the value transmitted as the credit information to the value held in the above-mentioned storage section to obtain the free space of the reception section 13. The transmission section 12 interrupts data frame transmission when the obtained free space is "0," and transmits data frames n times when the free space is "n" (integer of n>0).

Figure 3:
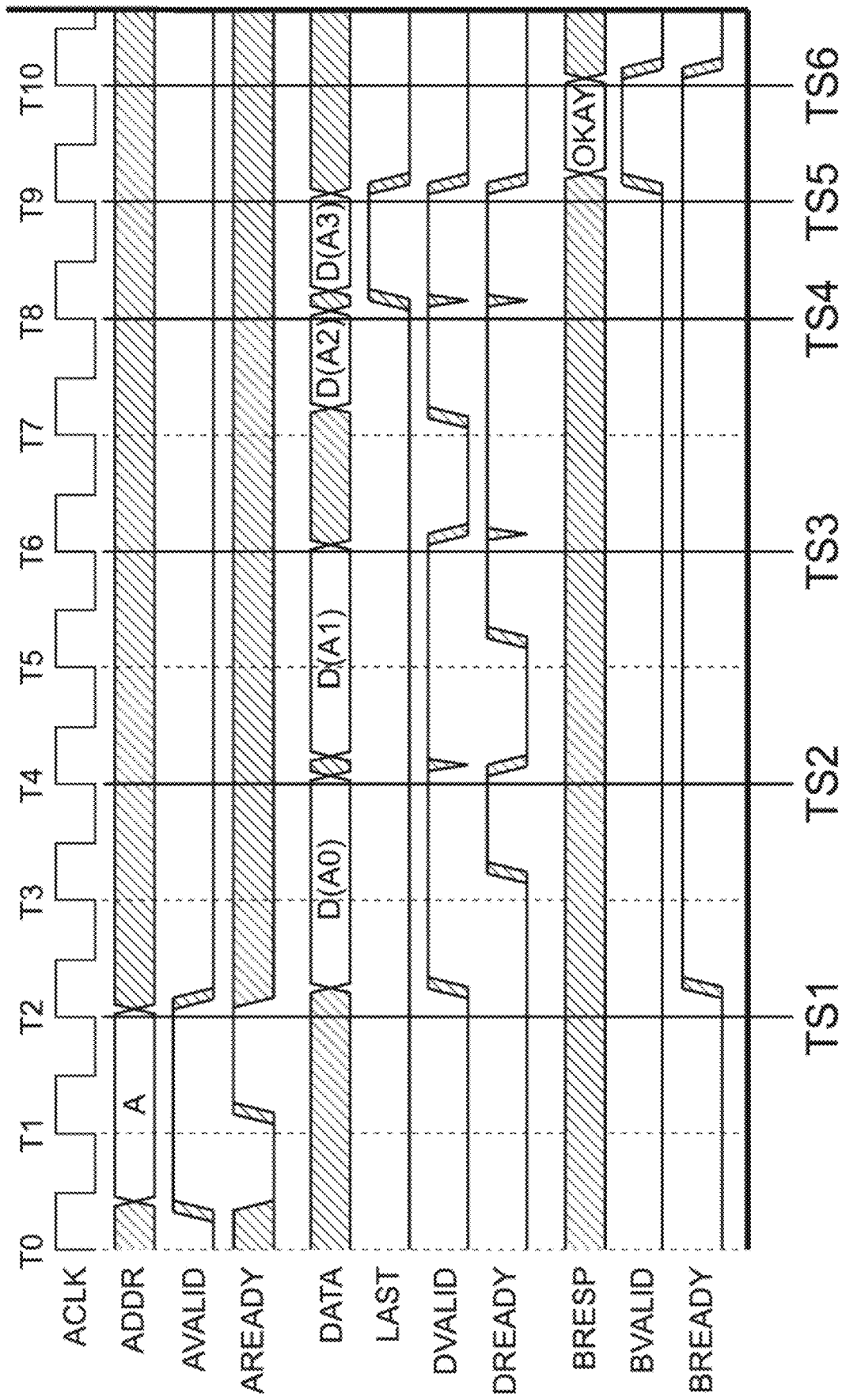
FIG. 3 is an explanatory diagram illustrating signals on a signal line in the signal processing chip according to the example of the embodiment of the present invention.

The wrapper section 10 basically has the configuration described above and operates as follows. FIG. 3 is an explanatory diagram illustrating some exemplary signals that are transmitted through the signal line L in the signal processing chip 1. Note that, in the following example, a pair of signal processing chips 1a and 1b are connected to each other via the chip-to-chip interconnect C.

Further, the plurality of signal processing blocks B included in each of the signal processing chips 1a and 1b transmit and receive the following signals via the signal line L in the signal processing chip 1a or 1b as exemplified in FIG. 3: a clock (ACLK); an address signal (ADDR: with a plurality of bits); a signal indicating the validity of an address signal (AVALID); a signal indicating that an address signal is ready (AREADY); a data signal (DATA: with the number of bits corresponding to a data width); a signal indicating the end of a data signal (LAST); a signal indicating the validity of a data signal (DVALID); a signal indicating that data is ready (DREADY); a response signal (BRESP); a signal indicating the validity of a response signal (BVALID); and a signal indicating that a response signal is ready (BREADY).

Thus, in this example, the bit width of the chip-to-chip interconnect C is determined in advance as a value that allows those signals to be transmitted all at once (in parallel), or parallel-to-serial conversion and serial-to-parallel conversion are performed between the transmission section 12 and the reception section 13.

In this example, first, a sampling section 11a of a wrapper section 10a of the signal processing chip 1a (in the following, for differentiation, the sections in the wrapper section 10 of the signal processing chip 1a are suffixed with the letter a and the sections in the wrapper section 10 of the signal processing chip 1b are suffixed with the letter b) performs sampling (digital sampling) of the signals excluding the address clock every given timing, and outputs information including the signals to a transmission section 12a as a data frame. The transmission section 12a temporarily holds the data frame output from the sampling section 11a in the buffer.

The transmission section 12a receives the input of credit information that a reception section 13a has received from the signal processing chip 1b (the other signal processing chip connected by the chip-to-chip interconnect C) serving as a data frame transmission destination, and calculates information regarding the free space of a reception section 13b of the signal processing chip 1b serving as a transmission destination.

Then, the transmission section 12a refers to the information regarding the free space of the reception section 13b of the signal processing chip 1b calculated here, and transmits, when there is room, the data frame (including information indicating the status (H or L) of each of the address signal (ADDR), each bit of the signal indicating the validity of an address signal (AVALID), the signal indicating that an address signal is ready (AREADY), each bit of the data signal (DATA), the signal indicating the end of a data signal (LAST), the signal indicating the validity of a data signal (DVALID), the signal indicating that data is ready (DREADY), the response signal (BRESP), the signal indicating the validity of a response signal (BVALID), and the signal indicating that a response signal is ready (BREADY) that have been obtained by single sampling) held in the buffer to the signal processing chip 1b serving as a transmission destination via the chip-to-chip interconnect C. Further, in a case where it is determined that there is no room as a result of referring to the free space ("0"), the transmission section 12a receives the credit information and waits until sufficient space is created.

In addition, when the transmission section 12a receives, from the reception section 13a, the input of credit information indicating the increase or decrease of the free space of the buffer included in the reception section 13a, the transmission section 12a transmits the credit information to the signal processing chip 1b via the chip-to-chip interconnect C.

The reception section 13a temporarily holds, in its own buffer, data frames obtained by sampling in the signal processing chip 1b to be transmitted from the signal processing chip 1b. Further, the reception section 13a operates as one of the signal processing blocks in the signal processing chip 1a. When timing at which signals based on the buffered data frames in the reception section 13a can be output on the signal line L in the signal processing chip 1a comes, at this timing, the reception section 13a outputs the buffered data frames to an inverse sampling section 14a and deletes the data frames from the buffer (increases the free space).

Further, the reception section 13a obtains the increase or decrease value of the free space of its own buffer and instructs the transmission section 12a to transmit, as credit information, the increase or decrease value to the signal processing chip 1b connected via the chip-to-chip interconnect C.

In addition, the reception section 13a receives credit information from the signal processing chip 1b via the chip-to-chip interconnect C. Then, the reception section 13a outputs the received credit information to the transmission section 12a.

The inverse sampling section 14a reproduces, on the basis of data frames input from the reception section 13a, signals on the signal line L in the signal processing chip 1b and outputs the signals on the signal line L in the signal processing chip 1a. Here, the inverse sampling section 14a receives, from the reception section 13a, information indicating the status (H or L) of each of the address signal (ADDR), each bit of the signal indicating the validity of an address signal (AVALID), the signal indicating that an address signal is ready (AREADY), each bit of the data signal (DATA), the signal indicating the end of a data signal (LAST), the signal indicating the validity of a data signal (DVALID), the signal indicating that data is ready (DREADY), the response signal (BRESP), the signal indicating the validity of a response signal (BVALID), and the signal indicating that a response signal is ready (BREADY) that have been obtained by single sampling on the signal line L in the other signal processing chip described above, reproduces the signals described above on the basis of the information, and outputs the signals on the signal line L of the signal processing chip 1a.

With this, the signal processing blocks B in the signal processing chip 1a each receive signals on the signal line L in the other signal processing chip 1b via the chip-to-chip interconnect C and the signal line L in the signal processing chip 1a.

In this way, in the present embodiment, the signal processing chips 1a and 1b connected to each other by the chip-to-chip interconnect C each sample signals in the corresponding signal line L and transmit and receive data frames indicating the sampled signals via the chip-to-chip interconnect C that is parallel communication means (capable of transmitting multiple bits all at once). Further, at this time, on the basis of data frames obtained by sampling signals in the signal line L of one of the signal processing chips, signals in the signal line L of the other signal processing chip are reproduced, so that no overhead such as protocol conversion, packetization, or the addition of various types of header information occurs, with the result that an increase in amount of data that is transferred between the chips can be prevented and the delay of the entire signal processing can be reduced.

In addition, in the present embodiment, the sampling of signals on the signal line L by the sampling section 11 is not necessarily always performed, and the sampling section 11 may perform sampling at at least one of the following time points:

(1) When there is a change in signal on the signal line that is sampled;
(2) When a control signal indicating the status of the signal processing block and/or the signal line indicates a given status; and
(3) When the status of the signal line that is sampled becomes a given status.

For example, the sampling of signals on the signal line L by the sampling section 11 is not necessarily always performed at every clock signal change timing (for example, every clock signal rising timing), and may be performed at timing at which a condition that signals to be transmitted are significant is satisfied. Note that, whether or not a signal is significant may be determined on the basis of, for example, the validity signal (VALID) or the signal indicating that the signal is ready that is transmitted by the corresponding control signal line.

Specifically, in the example of FIG. 3, the sampling section 11 samples the address signal, the data signal, and the response signal at respective time points corresponding to the following periods in which the signals are significant signals in the period of from T0 to T10 of the clock (ACLK):

(1) When the address signal (ADDR) is valid (AVALID is "H") and the signal is ready (AREADY is "H") (period of from T1 to T2);
(2) When the data signal (DATA) is valid (DVALID is "H") and the signal is ready (DREADY is "H") (periods of from T3 to T4, T5 to T6, T7 to T8, and T8 to T9); and (3) When the response signal (BRESP) is valid (BVALID is "H") and the signal is ready (BREADY is "H") (period of from T9 to T10).

Here, when the sampling section 11 performs sampling at timing at which the clock (ACLK) rises, the sampling section 11 samples the signals at start timing (TS1, TS2, TS3, TS4, TS5, and TS6) of the cycles T2, T4, T6, T8, T9, and T10. That is, in this example, the sampling section 11 does not perform sampling at the clock rising timing in T3 and T7 and the transmission section 12 thus only transmits data frames indicating signals sampled at the timing TS1, TS2, TS3, TS4, TS5, and TS6 described above, with the result that the amount of information that is transmitted and received via the chip-to-chip interconnect C can be further reduced.

Further, the way to determine whether or not a signal is significant is not limited to the above-mentioned example in which a determination is made on the basis of the corresponding validity signal (VALID) or signal indicating that the signal is ready. For example, the sampling section 11 may refer to a control signal indicating the status of the signal line L (valid (enable)/invalid (disable)), which is the interconnect of the signal processing blocks B in the chip, and perform sampling only when the signal line L is in the valid status. Further, the sampling section 11 may refer to a control signal indicating the status of the signal processing block B (bus/cycle enable, clk/power gating enable, or the like) connected via the signal line L, and perform sampling only when the status of the signal processing block is valid.

In addition, the sampling section 11 may sample signals in the subject wire included in the signal line L connected to the sampling section 11 itself only when there is a change in signal in the subject wire, that is, only when there is a change from "L" to "H" or from "H" to "L" in signal in the subject wire.

In this example, the data frames that are transmitted by the transmission section 12 include information indicating a change in signal (raw value) in each subject wire.

Thus, in this example, the inverse sampling section 14 continuously outputs signals based on previously input information until information indicating signals sampled by another signal processing chip 1 is input, and, when receiving the input of the information sampled by the other signal processing chip 1, the inverse sampling section 14 sets signals (raw values) in the corresponding subject wire on the basis of the input information.

With this, sampling can be performed only at necessary timing, so that unnecessary information transmission and reception between the signal processing chips can be prevented.

<Example of Application to Different On-Chip Interconnects>

Further, the signal line L serving as the on-chip interconnect in the signal processing chip 1 and configured to connect the signal processing blocks B to each other is not limited to the bus type example described above.

Figure 4:
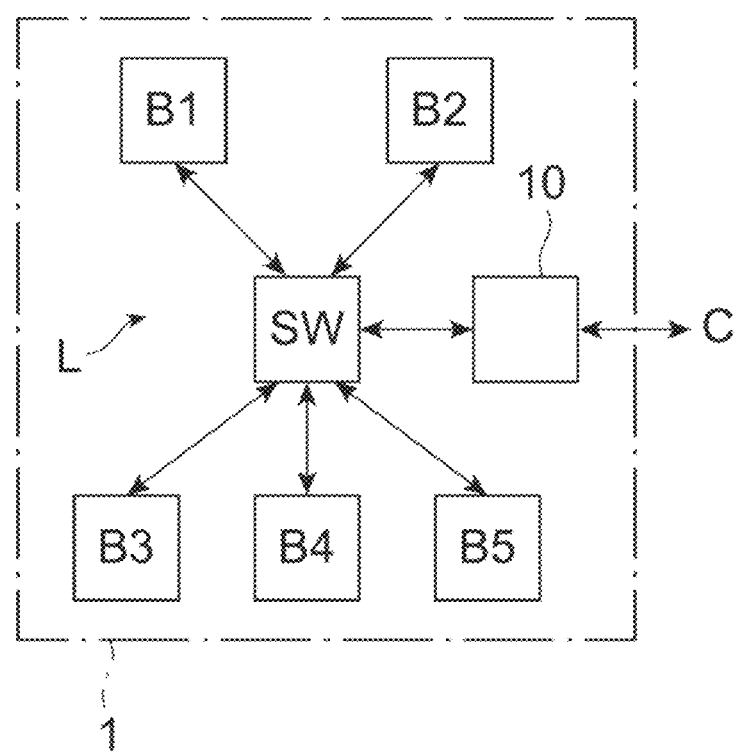
FIG. 4 is a block diagram illustrating another configuration example of the signal processing chip according to the example of the embodiment of the present invention.

For example, another example of the signal processing chip 1 according to the embodiment of the present invention has a network-on-chip (NoC) configuration. The signal processing chip 1 of this example includes, as exemplified in FIG. 4, the plurality of signal processing blocks B1, B2, etc., connected to each other by the signal line L including a switch SW. In this example, the wrapper section 10 is connected to the switch SW.

Here, the switch SW controls signal routing between the signal processing blocks B. The switch SW can use widely known various configurations, and hence a detailed description thereof is omitted herein.

In this example of the present embodiment, the sampling section 11 of the wrapper section 10 samples signals to be transmitted to signal processing blocks B1b, B2b, etc., in another signal processing chip 1 connected via the chip-to-chip interconnect C, and outputs data frames obtained by sampling to the transmission section 12. The transmission section 12 and the reception section 13 operate as in the example already described, and hence repetitive descriptions thereof are omitted.

Further, the inverse sampling section 14 of this example reproduces signals on the basis of data frames input from the reception section 13 and outputs the signals to the switch SW in the signal line L.

Figure 5:
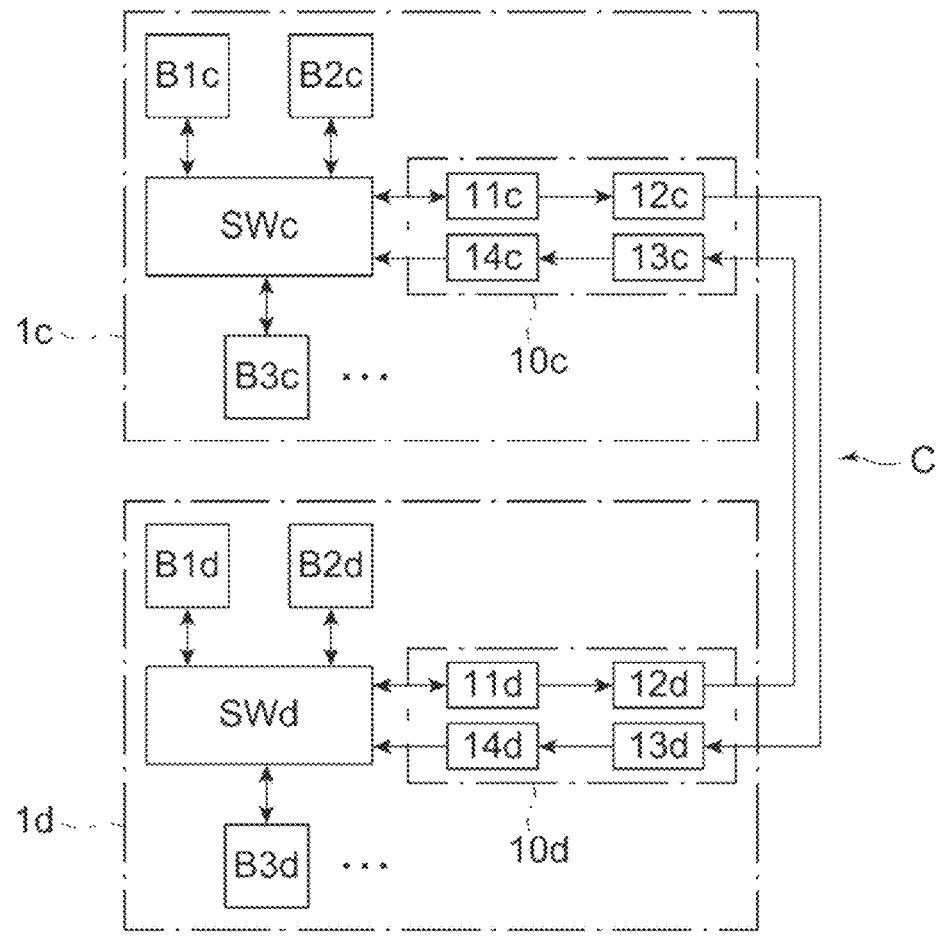
FIG. 5 is a block diagram illustrating another connection example of signal processing chips according to the example of the embodiment of the present invention.

In this example, as exemplified in FIG. 5, a pair of signal processing chips 1c and 1d connected to each other via the chip-to-chip interconnect C each have a network-on-chip (NoC) configuration and include the plurality of signal processing blocks B connected to each other by a signal line Lc or Ld including a switch SWc or SWd included in the signal processing chip 1c or 1d.

Note that, also in this example, the bit width of the chip-to-chip interconnect C is determined in advance as a value that allows a large number of signals to be transmitted all at once (in parallel) like the chip-to-chip interconnect C between the signal processing chips 1a and 1b already described.

In this example, the switch SWc of the signal processing chip 1c outputs, by routing, signals to be transmitted to signal processing blocks Bd1, Bd2, etc., included in the signal processing chip 1d (signals to be transmitted to the signal processing blocks B not included in the signal processing chip 1c) to a wrapper section 10c (in the following, for differentiation, the sections in the wrapper section 10 of the signal processing chip 1c are suffixed with the letter c and the sections in the wrapper section 10 of the signal processing chip 1d are suffixed with the letter d).

A sampling section 11c of the wrapper section 10c performs sampling (digital sampling) of signals input from the switch SWc and outputs the signals to a transmission section 12c. The transmission section 12c temporarily holds the data frame output from the sampling section 11c in the buffer.

The transmission section 12c receives the input of credit information that a reception section 13c has received from the signal processing chip 1d (the other signal processing chip connected by the chip-to-chip interconnect C) serving as a data frame transmission destination, and calculates information regarding the free space of a reception section 13d of the signal processing chip 1d serving as a data frame transmission destination.

Then, the transmission section 12c refers to the information regarding the free space of the reception section 13d of the signal processing chip 1d calculated here, and transmits, when there is room, the data frame (information indicating the signals obtained by single sampling) held in the buffer to the signal processing chip 1d serving as a transmission destination via the chip-to-chip interconnect C. Further, in a case where there is no room as a result of referring to the free space ("0"), the transmission section 12c receives the credit information and waits until sufficient space is created.

In addition, when the transmission section 12c receives, from the reception section 13c, the input of credit information indicating the increase or decrease of the free space of the buffer included in the reception section 13c, the transmission section 12c transmits the credit information to the signal processing chip 1d via the chip-to-chip interconnect C.

The reception section 13c temporarily holds, in its own buffer, data frames obtained by sampling in the signal processing chip 1D to be transmitted from the signal processing chip 1d. Further, the reception section 13c operates as one of the signal processing blocks in the signal processing chip 1c. When timing at which signals based on the buffered data frames in the reception section 13c can be output on the switch SWc on the signal line Lc in the signal processing chip 1c comes, at this timing, the reception section 13c outputs the buffered data frames to an inverse sampling section 14c and deletes the data frames from the buffer (increases the free space).

Further, the reception section 13c obtains the increase or decrease value of the free space of its own buffer and instructs the transmission section 12c to transmit, as credit information, the increase or decrease value to the signal processing chip 1d connected via the chip-to-chip interconnect C.

In addition, the reception section 13c receives credit information from the signal processing chip 1d via the chip-to-chip interconnect C. Then, the reception section 13c outputs the received credit information to the transmission section 12c.

The inverse sampling section 14c receives, from the reception section 13c, a data frame output from the switch SWd in the other signal processing chip 1d and indicating the signals obtained by single sampling, reproduces the signals described above on the basis of the data frame, and outputs the signals to the switch SWc of the signal line Lc.

With this, the signal processing blocks B in the signal processing chip 1c each receive signals transmitted from the signal processing block in the other signal processing chip 1d via the switch SWd, the chip-to-chip interconnect C, and the switch SWc in the signal line Lc in the signal processing chip 1c.

Figure 6:
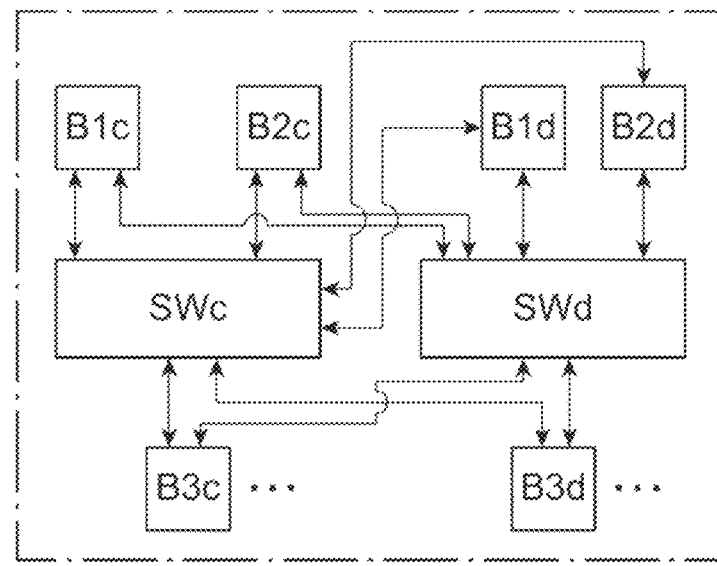
FIG. 6 is an explanatory diagram illustrating examples of functions that are realized by the plurality of signal processing chips according to the example of the embodiment of the present invention.

In this way, in the present embodiment, the signal processing chips 1c and 1d connected to each other by the chip-to-chip interconnect C each sample signals between their own switches SW and transmit and receive data frames indicating the sampled signals via the chip-to-chip interconnect C that is parallel communication means (capable of transmitting multiple bits all at once), for example. That is, in this example of the present embodiment, a configuration similar to the configuration as exemplified in FIG. 6 in which the plurality of switches SWc and SWd are provided on the on-chip interconnect can be realized with the plurality of chips. Further, also in this example, the sampling of signals output from the switch SW by the sampling section 11 is not necessarily always performed at every clock signal change timing (for example, every clock signal rising timing), and may be performed at timing at which the condition that signals to be transmitted are significant is satisfied, as already described, for example. Note that, whether or not a signal is significant may be determined on the basis of the corresponding validity signal (VALID) or signal indicating that the signal is ready, or may be determined by referring to the status of the signal line L (a signal indicating the valid (enable)/invalid (disable) of the bus or clock or the like), which is the interconnect of the signal processing blocks B in the chip.

<Example in which Signal is Sampled without Switch>

Note that, there is a case where while a network on-chip interconnect is used for main data transmission and reception, a shared bus MMIO (Memory Mapped Input Output) access interconnect is used for register or memory access between signal processing blocks. Further, there is also a case where a signal line for system control (a control line for signals for power management or DFT (Design For Testability)/DFD (Design For Diagnosability), or interrupt signals) is connected as a dedicated line. In addition, there is a case where some signal processing blocks include block-specific dedicated lines that are unidirectional crossbar signal lines (for outputting signals one-sidedly).

Further, the wrapper section 10 of the signal processing chip 1 of this example not only samples signals on the interconnect for transmitting and receiving main data via the switch SW (main data interconnect), but also samples signals on those signal lines to generate and transmit data frames and outputs, on those signal lines, signals reproduced on the basis of data frames received via the chip-to-chip interconnect C.

Here, signals that are sampled without the switch SW are sampled at timing independent of timing at which signals are input from the switch SW. Specifically, with regard to those signal lines, sampling may be performed at every clock signal change timing (for example, every clock signal rising timing), or may be performed at timing at which the condition that signals to be transmitted are significant is satisfied, as already described, for example. Also in this example, whether or not a signal is significant may be determined on the basis of the corresponding validity signal (VALID) or signal indicating that the signal is ready, or may be determined by referring to the status of each signal line (a signal indicating the valid (enable)/invalid (disable) of the bus or clock or the like), which is the interconnect of the signal processing blocks B in the chip.

<Modified Example of Information that is Transmitted and Received>

Further, the transmission section 12 of the wrapper section 10 of the present embodiment may add information for quality control (QoS control) to buffered information and transmit the information. Examples of this information for QoS control include timestamps and priority information.

Specifically, the transmission section 12 of this example may include a timer section (timer module or the like), which is not illustrated, and at time points at which the transmission section 12 transmits buffered data frames, the transmission section 12 may transmit the data frames including, as timestamps, time information obtained by the timer section. In addition, when buffered data frames are sequentially transmitted, the buffered data frames may be transmitted with priority information.

In the case where the reception section 13 receives data frames including timestamps, the reception section 13 may hold the data frames in the buffer in the order of the timestamps and output the buffered data frames to the inverse sampling section 14 in ascending order of timestamps.

Note that, in the case where priority information is included, the reception section 13 may output the received data frames in order of high to low priority (or may output the data frames with the same priority in ascending order of timestamps) to the inverse sampling section 14.

Further, the transmission section 12 may encode, in consideration of the electrical conditions of the chip-to-chip interconnect C (conditions that enhance the certainty of communication such as the necessity of a reduction in frequency bandwidth), data frames to be transmitted to information such as 128B/130B and transmit the information. Further, data frames may be encoded as information with an error correction code (error detectable/correctable information) and transmitted.

In this case, the reception section 13 decodes the encoded data frames and accumulates the data frames in the buffer. In this example, the amount of information that is transmitted and received is slightly increased, but the amount of increase can be much small as compared to the example using protocol conversion or the like.

<Example in which Three or More Chips are Connected to Each Other Via Chip-to-Chip Interconnects>

In the description so far, the example in which the two chips are connected to each other via the chip-to-chip interconnect C is described, but the number of chips that are connected to each other via the chip-to-chip interconnect C is not limited to two.

In a certain example of the present embodiment, the three or more signal processing chips 1 are connected to each other via the plurality of chip-to-chip interconnects C. The chip-to-chip interconnect C for the plurality of chips of this example may have a network structure based on various topologies such as tree structure, mesh structure, and torus structure.

Further, in this example, identification information unique to each of the signal processing blocks B in each of the signal processing chips 1 is assigned to the signal processing blocks B in advance. Further, a wrapper section 10' included in the signal processing chip 1 of this example includes, as exemplified in FIG. 7, the sampling section 11, an identification information table 21, an identification information adding section 22, an identification information decoding section 23, a transmission section 12', a reception section 13', and an inverse sampling section 14'. Here, the sampling section 11 is similar to that of the example already described, and hence a repetitive description thereof is omitted.

In the identification information table 21, as exemplified in FIG. 8, identification information different between all the signal processing blocks B of all the signal processing chips 1 connected to each other via the chip-to-chip interconnects C (in a case where the signal processing chips 1a, 1b, and 1c are connected to each other, none of the signal processing blocks B included in the signal processing chips 1a, 1b, and 1c has the same identification information I) is associated with a location flag E indicating whether or not the signal processing block B identified by the identification information is located in the signal processing chip 1.

In addition, in the example of the present embodiment, as this identification information, the identification information I unique to each of all the combinations (including transmission direction) of the signal processing blocks B of all the signal processing chips 1 connected to each other via the chip-to-chip interconnects C and configured to transmit and receive data frames is set. That is, the identification information I indicates the signal processing block B serving as a signal transmission source (source) and the signal processing block B serving as a signal transmission destination (destination) as follows, for example: "1" is set as identification information identifying data frames that are transmitted from a signal processing block Ba included in the signal processing chip 1a to a signal processing block Bb included in the signal processing chip 1b; and "2" is set as identification information identifying data frames that are transmitted from the signal processing block Ba included in the signal processing chip 1a to a signal processing block Bc included in the signal processing chip 1b.

The identification information table 21 may further be associated with information F indicating the format of signals that are received by the signal processing block B identified by identification information. The information F indicating a format may include information indicating the relations between the plurality of wires included in the chip-to-chip interconnects C and signals that are transmitted and received with the wires, the type or frequency of the signal line (on-chip interconnect) in which the signals have been sampled, and the like. In this way, the information F indicating a format may include various types of additional information indicating the format of signals on the signal line. Further, each piece of identification information may be associated with the information F indicating a plurality of types of formats.

In a case where the signal processing block B serving as the destination of data frames obtained by sampling by the sampling section 11 is specified (by address information or the like), the identification information adding section 22 adds, to the data frames obtained by sampling, identification information specifying the signal processing block B that has output the sampled signals (source block Bs) and the signal processing block B specified as the destination (destination block Bd), and outputs the data frames to the transmission section 12'. The identification information decoding section 23 is described later for the sake of convenience.

The transmission section 12' buffers those data frames with the identification information (including information obtained by sampling the statuses of the signals of each sampled wire in the signal line L), and transmits, at timing at which a predetermined condition is satisfied, the buffered data frames to the other signal processing chips 1 via the chip-to-chip interconnects C. This data frame transmission timing may be timing determined by utilizing credit information, as already described.

Note that, in this example, since the plurality of signal processing chips 1 are data frame transmission destinations, the transmission section 12' calculates the free space of the buffer of the reception section 13 in each of the other signal processing chips 1 on the basis of the credit information, and transmits data frames corresponding to the free space (the amount of data that can be accumulated in the free space) of the signal processing chip 1 having the minimum free space of the buffer of the reception section 13. Here, when the minimum free space is "0," the transmission section 12' waits data frame transmission.

For this purpose, in this example of the present embodiment, unique identification information (chip ID) is also assigned to each of the signal processing chips 1 connected to each other by the chip-to-chip interconnects C, credit information that is transmitted and received is transmitted with the chip IDs, and the transmission section 12' refers to the chip IDs transmitted together with the credit information to update information regarding the corresponding free space.

The reception section 13' receives data frames transmitted from the other signal processing chips 1 via the interconnects C, buffers the data frames, and outputs the data frames to the identification information decoding section 23 at given timing.

The reception section 13' also operates as one of the signal processing blocks B in the signal processing chip 1. When timing at which signals based on data frames temporarily held in the buffer can be output on the signal line L in the signal processing chip 1 comes, at this timing, the reception section 13' outputs the buffered data frames to the identification information decoding section 23 and deletes the data frames from the buffer (increases the free space).

The identification information decoding section 23 refers to identification information included in data frames input from the reception section 13', and, in a case where the location flag E recorded on the identification information table 21 in association with the identification information indicates that the signal processing block B is located in the signal processing chip 1 including the identification information decoding section 23 in question (True in FIG. 8), the identification information decoding section 23 removes the identification information from the data frames input from the reception section 13' and outputs the data frames to the inverse sampling section 14 connected to the signal processing block B serving as a destination (destination block Bd).

Further, in a case where the information F indicating the format of the signals that are received by the signal processing block B identified as the destination (destination block Bd) by the identification information is further recorded on the identification information table 21, the identification information decoding section 23 may refer to the information F indicating a format associated with the identification information included in the data frames input from the reception section 13', and further output, to the inverse sampling section 14', additional information indicating the relations between the wires of the signal line L and signals obtained by inversely sampling the data frames to be output with the wires, the sampling rate (frequency), and the like.

When receiving data frames input from the identification information decoding section 23, the inverse sampling section 14' reproduces, on the basis of the data frames, signals in the connection line L in another signal processing chip serving as the transmission source of the data frames and connected via the chip-to-chip interconnect C, and outputs the reproduced signals to the signal line L in the self chip including the inverse sampling section 14' in question.

Further, the inverse sampling section 14' may receive, from the identification information decoding section 23, together with data frames obtained by sampling in another signal processing chip, additional information indicating which of signals obtained by inversely sampling the data frames is to be output, the sampling rate (frequency), and the like (format information), reproduce each signal on the basis of the format information, and output the signals to the signal line L.

Note that, in a case where a predetermined format is used, this format information is not necessarily required and there is no need to record the information F indicating a format on the identification information table 21.

<Designation of Destination without Identification Information>

Further, in the description so far, the signal processing block B serving as a data frame destination is specified using identification information, but the present embodiment is not limited thereto. For example, the order of all the signal processing blocks B (or destination candidate signal processing blocks B) of all the signal processing chips 1 connected to each other via the chip-to-chip interconnect C may be set in advance, and the transmission section 12 may rearrange data frames input from the sampling section 11 in the above-mentioned order determined in advance with regard to the signal processing blocks serving as the destinations of the data frames, and transmit, to another signal processing chip, the data frames at timing at which a predetermined condition is satisfied.

Such processing is suitable for a case where signals need to be always transmitted to the signal processing blocks B via the chip-to-chip interconnect C. A destination is designated on the basis of the order in this way (N-th received information is identified to be transmitted to the (N mod P)+1-th signal processing block B in the above-mentioned determined order, where P indicates the number of destination candidate signal processing blocks B the order of which is set, and X mod Y means the remainder of X divided by Y), so that data frame destinations can be designated without the addition of identification information.

<Frame Alignment>

Further, in the description so far, the bit width of the chip-to-chip interconnect C is equal to or smaller than a bit width w of a data frame obtained by signal sampling in each of the signal processing chips 1, which are connected to each other by the chip-to-chip interconnect C, to be transmitted and received between the chips. In this example, the values of the bits of the chip-to-chip interconnect C that are not used are set by a predetermined padding method. For example, a signal indicating that the values of bits that are not used are "0" is transmitted via the wire corresponding to the bits.

In this case, data frames are aligned to pieces of information (information with a bit width equal to or smaller than the bit width w, which is hereinafter referred to as a "transfer frame") that are transmitted all at once via the chip-to-chip interconnect C.

However, the signal processing chip 1 may transmit and receive data frames without aligning the data frames to transfer frames (that is, may transmit and receive a single data frame extending over a plurality of transfer frames) as follow.

Figure 9:
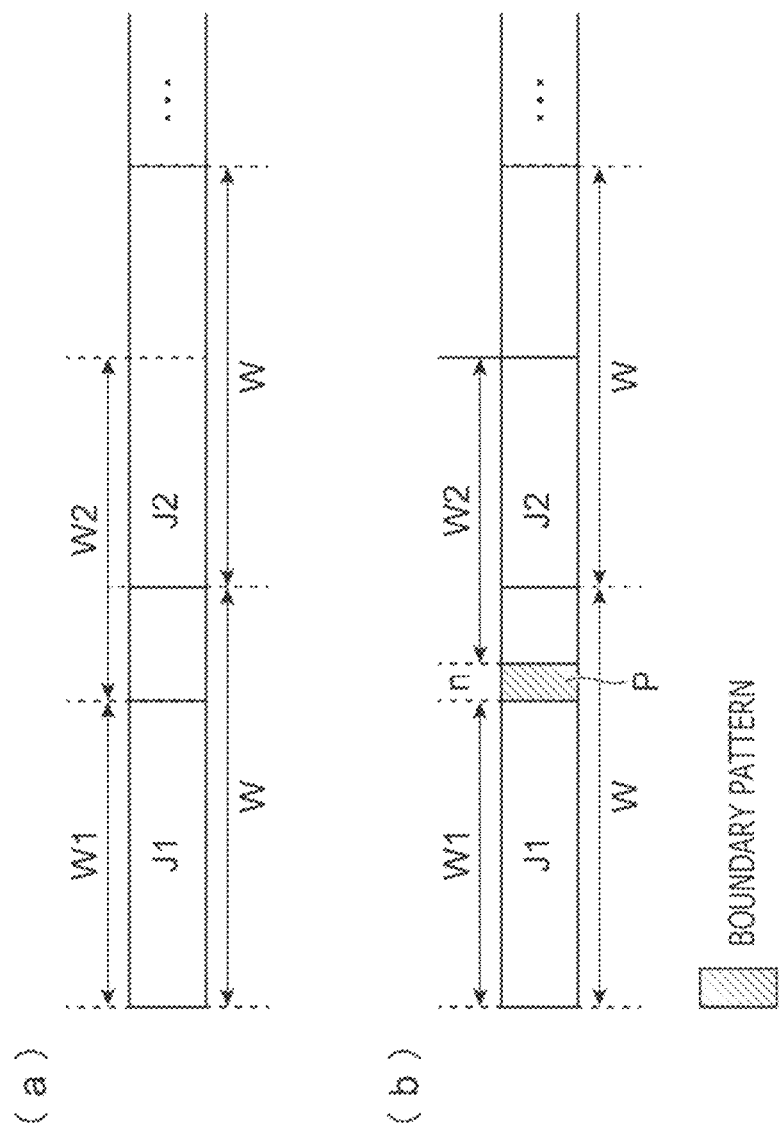
FIG. 9 is an explanatory diagram illustrating an example of information that is output from the signal processing chip according to the embodiment of the present invention.

In this example of the present embodiment, as exemplified in FIG. 9(a), when a plurality of transfer frames are sequentially transmitted via the chip-to-chip interconnect C having the bit width w, a plurality of data frames J1, J2, etc., may be included without being aligned to a bit width w of transfer frames. That is, the transmission section 12 of the signal processing chip 1 that transmits data frames may pack, in accordance with a predetermined packing rule, the information included in at least one of the data frames to be transmitted into a plurality of transfer frames to generate transfer frames.

Specifically, in a case where the wrapper section 10 or 10' of the signal processing chip 1a serving as a transmitter transmits the data frame J1 having a bit length w1, the data frame J2 having a bit length w2, and the like obtained by sampling (note that, w1+w2>w and w1 and w2 are not necessarily equal to each other), the wrapper section 10 or 10' transmits the first transfer frame including the entire data frame J1 and information corresponding to the first (w2−(w1+w2−w)) bits of the data frame J2, and the second frame including information corresponding to the remaining bits of the data frame J2.

In this case, the signal processing chip 1b that has received those plurality of transfer frames sequentially takes, in accordance with a given rule (for example, the bit length of the data frames is determined from the signal received first), the information corresponding to the bit length of the original data frames (information included in the data frames J1, J2, etc.), and records the information in the buffer. In this case, there is no need to include information indicating data frame boundary locations.

However, the method of packing the information included in a plurality of data frames having a bit length shorter than W in total into one or more transfer frames having the bit length W is not limited to this example. Any packing rule determined in advance between the signal processing chips 1 connected to each other by the chip-to-chip interconnect C can be used.

Further, although the transfer efficiency slightly drops, information indicating data frame boundary locations may be included. Specifically, one of the wires of the chip-to-chip interconnect C is set as a dedicated line for indicating boundary locations, and a specific bit pattern (magic number value or the like) is included at the boundary locations of information. In this case, as in the example above, when the wrapper section 10 or 10' of the signal processing chip 1a serving as a transmitter transmits, of the frames, the information (data frame) J1 having the bit length w1, the information (data frame) J2 having the bit length w2, and the like obtained by sampling, as illustrated in FIG. 9(b), the wrapper section 10 or 10' transmits the first transfer frame including the data frame J1 in the first w1 bits, a bit pattern p indicating a boundary location (boundary pattern: here n bits), and information corresponding to the first (w2−(w1+w2+n−w)) bits of the data frame J2, and the second transfer frame including information corresponding to the remaining bits of the data frame J2.

<Example in which Plurality of Types of Sampling Results are Included in Data Frame Plurality of Times>

Further, a single data frame may include the results of a plurality of samplings in terms of time or a plurality of types of sampling results. That is, it is only necessary that the formats of data frames be known between the signal processing chips 1 serving as a transmitter and a receiver.

That is, with regard to the data frames in the description so far, the information included in each data frame that is transmitted by single transmission is not limited to information obtained by single sampling. That is, a single data frame may include information obtained by sampling signals on the signal line that are output from the plurality of source blocks. Further, a single data frame may include information indicating signals sampled at a plurality of time points different from each other.

The inverse sampling section 14 that has received such a data frame reproduces, on the basis of the signals output from the plurality of source blocks indicated by the information included in the data frame, signals on the signal line connected to a destination block serving as the corresponding destination. Further, in the case where signals sampled at a plurality of time points are included in a data frame, the signals on the signal line connected to a destination block serving as the corresponding destination are reproduced in the order of sampling (at timing corresponding to the times at which the signals have been sampled).

<Modified Example Related to Chip-to-Chip Interconnect>

In addition, the flow control in the chip-to-chip interconnect C is not limited to the example described so far, in which credit control is performed, and some other control such as virtual channel may be performed. Further, well-known QoS control may be performed.

Further, the chip-to-chip interconnect C is not limited to the parallel wiring described so far. In a case where any of the signal processing blocks B in the signal processing chip 1 is specified as the destination of signals with use of identification information, with the switch SW disposed on the chip-to-chip interconnect C, the information may be routed in the signal processing chip 1 including the signal processing block B serving as the destination with reference to the identification information.

<Coverage of Signal with Fixed Number of Cycles>

In on-chip interconnects in recent years, what is generally called split transaction in which the phase of command transmission and reception and the phase of data transmission and reception are split has been mainstream. In this split transaction, commands and data can be transmitted at any timing (at intervals with any number of cycles), and hence there is no problem for transmitting and receiving signals by the method of the present embodiment.

However, it is conceivable that, in a case where a fixed cycle is assumed in operation and the operation needs to wait for a given operation cycle or a case where a response needs to be taken in a certain cycle, there arises a need for the successive (uninterrupted) transmission and reception of the sampling results of signals corresponding to a plurality of cycles.

Thus, in the present embodiment, when transmitting data frames via the chip-to-chip interconnect C, the signal processing chip 1 may receive information designating one of a fixed cycle mode in which data frames based on signals successively sampled at a plurality of time points are transmitted in succession and a normal mode in which data frames are transmitted at any timing as described so far, and transmit the data frames in the mode based on this mode designation.

Specifically, in an example of the present embodiment, when the signal processing block B that transmits signals or the sampling section 11 transmits or samples predetermined types of signals, the fixed cycle mode is designated for transmission.

In the period in which the fixed cycle mode is designated (for example, the period of a given clock cycle), the sampling section 11 samples signals on the signal line L every clock (performs sampling in succession) to generate data frames and outputs the data frames to the transmission section 12. Further, the transmission section 12 (or the transmission section 12', which operates like the transmission section 12 from here and description thereof is thus omitted) transmits the data frames output from the sampling section 11 to another signal processing chip 1 without changing the sampling order.

Alternatively, in the period in which the fixed cycle mode is designated, the sampling section 11 may pack information obtained by sampling signals on the signal line L every clock (performing sampling in succession) into a single data frame and output the data frame to the transmission section 12.

Further, at this time, the transmission section 12 may wait until the buffer of the reception section 13 of the signal processing chip 1 serving as a data frame transmission destination secures sufficient free space for the transmission of the entire information to be transmitted in the fixed cycle mode, and transmit the data frame.

In addition, in this example, the transmission section 12 may add, to data frames to be transmitted in the fixed cycle mode, flag information indicating that the data frames are transmitted in the fixed cycle mode. Then, the reception section 13 (or the reception section 13', which operates like the reception section 13 from here and description thereof is thus omitted) that has received those data frames with the flag information outputs the data frames with the flags in succession (without changing the cycle) at timing at which signals based on those data frames are transmittable.

With this, sampled signals are transferred between the signal processing chips without interruption. Note that, also in this example, flow control based on another method such as virtual channel or QoS may be employed.

<Case where Sampling Section Cannot be Disposed on Signal Line L>

Further, in the present embodiment, in a case where the sampling section 11 cannot be disposed on the signal line L and the sampling section 11 cannot sample signals on the signal line L, the wrapper section 10 may be disposed for each of the signal processing blocks B. In this case, the signal processing blocks B each output signals on the signal line L and also output the signals to the corresponding wrapper section 10. Further, the signal processing blocks B each receive signals on the signal line L and also receive signals from the corresponding wrapper section 10.

In this example, the wrapper sections 10 may transmit and receive data frames using the chip-to-chip interconnect C via a common transmission and reception section (PHY or the like).

In addition, instead of disposing the wrapper section 10 for each of the signal processing blocks B, the signal processing blocks B may each output signals on the signal line L and output the same signals to the single wrapper section 10.

The embodiment of the present invention can also be described as follows. That is, one of the features of the embodiment of the present invention is to provide a method of efficiently deploying and connecting, in multiple chips, an on-chip architecture assuming a single chip.

The background for providing such a method is that chip development cost and chip manufacturing cost have been rapidly increasing due to the progress of silicon process miniaturization. This has made it difficult to develop a huge SOC (System-On-Chip) chip every time according to requirements while enhancing the manufacturing yield of the huge chip and reducing the manufacturing cost.

Hitherto, such increases in cost have been able to be relatively offset by enhancing the degree of integration to reduce a silicon size required for realizing the same function or performance. It has, however, been becoming difficult to take such a measure in recent years. Further, a SOC includes analog circuits such as logic circuit, large-scale built-in memory, and PHY, and silicon processes suitable for the respective analog circuits are different from each other. Thus, the manufacturing yield and cost of a single chip including those components are difficult to optimize at present.

For example, when functions are aggregated in a single chip, the heat density in system operation is increased concentratedly in the single chip. Further, since a low latency multi-bit and broadband connection can be efficiently realized by an on-chip interconnect in a single chip as compared to a connection to a component outside the chip, aggregating functions in a single chip is effective means for function performance enhancement. On the other hand, however, it is difficult to solve the problems as described above.

Thus, in the present embodiment, it is an object to efficiently configure, using a plurality of chips, a huge system design that has been demanded to be integrated in a single chip, and it is another object to optimize the combination of system performance, manufacturing cost, and heat dissipation.

In the present embodiment, the number of chips that are used in a single system is changed to achieve scalable processing capability even with a common architecture. For example, a single GPU including multiple chips can be realized.

Further, the same chip can be used in handheld consoles, stationary equipment such as home console, and servers.

To achieve the objects described above, in the embodiment of the present invention, an on-chip interconnect assuming low latency multi-bit and broadband connections is efficiently converted to a chip-to-chip interconnect via a chip to chip physical link.

Here, the on-chip connection interconnect that is to be converted is roughly divided into the following four types. It is an object of the present embodiment to make it possible to handle those on-chip interconnects as transparent as possible even as chip-to-chip interconnects.

(1) Main Data Interconnect

This main data interconnect is an interconnect for main data transfer. Note that, a cache coherence protocol is included in some cases. This main data interconnect is, for example, AMBA AXI, CCI, or Infinity Fabric, and is used between a control unit and a cache or between caches (CU-L1, L1-L2, L1-RB, L1-distributed L2 huge crossbar, and the like), for example.

(2) MMIO Access Interconnect

This is an interconnect for allowing a CPU (Central Processing Unit) or control core to access the register or memory of each block in a chip.

(3) System Control System

This is an interconnect related to power manager control, a DFT/DFD system, interrupts, and the like.

(4) Block-Specific Dedicated Line

This is a local data bus, a handshake or control line, or the like. In a GPU or the like, this is used as a line from a command processor CP to each shader engine SE, a line from a rasterizer to each of the shader engines SE, a line from a geometry tessellation system to each of the shader engines SE, and the like.

As the related-art chip-to-chip interconnect, an on-chip interconnect having an out-of-chip connection port is connected to an external chip via an interface bridge or the like. However, with this method, the delay of protocol conversion or queuing is large and the throughput performance is low as compared to on-chip interconnects.

Further, due to a large delay, the throughput performance of transfer that needs handshaking such as a cache coherence protocol is particularly limited, for example, with the result that the overhead of the transport or data link layer serving as an external chip interface is large. Note that, even when an existing data compression scheme for reducing transfer data is employed, since the delay is large, the problems described above cannot be solved.

Thus, in the embodiment of the present invention, on the assumption that a broadband chip to chip physical link with a higher operating frequency than on-chip interconnects is used, frames obtained by sampling changes in raw values of signals that flow through the on-chip interconnects are transmitted and received.

Here, various on-chip protocols that are used in the transmission and reception of signals via the on-chip interconnects are not individually converted, and the signals can be sampled with a common scheme to be transmitted and received. Further, any protocol or bit width is used in the on-chip interconnects that are sampled.

Further, the sampling subject is not limited to the data lines of the interconnects, which are typical sampling subjects, and may include changes in raw values of signals that flow through the control lines.

In addition, in this sampling, sampling and frame generation may be performed only when there is a change in signal, that is, only when there is a change in signal edge (change from 0 to 1 or change from 1 to 0). With this, unnecessary information transfer can be skipped.

Further, whether or not sampling is performed may be determined by referring to control signals indicating the active/non-active of the interconnects and the master block (bus/cycle enable, clk/power gating enable, and the like). With this, cycles in which sampling is unnecessary are determined, and unnecessary transfer can thus be skipped.

Further, cycles in which sampling is unnecessary are determined by referring to the active (enable/disable, valid, ready, or the like) status of each cycle of the on-chip interconnects, and unnecessary transfer may be skipped.

Specifically, in the present embodiment, a transmitter (source) wrapper module configured to sample the values of the on-chip interconnects to generate frames is included. Further, a receiver that receives those frames includes a destination wrapper module configured to output the sampling values included in the received frames.

Further, the frames that are transmitted and received here may be frames with IDs specifying the source and the destination.

In an example that realizes this, a unique ID is added to the combination of a source block and a destination block. For example, when a source chip includes three blocks A, B, and C and a destination chip includes three blocks D, E, and F, IDs are assigned as follows.

That is, the IDs may be assigned as follows, for example: an ID of 1 is assigned to transfer of A to D; an ID of 2 is assigned to transfer of A to E; an ID of 3 is assigned to transfer of A to F; an ID of 4 is assigned to transfer of B to D; an ID of 5 is assigned to transfer of B to E; an ID of 6 is assigned to transfer of B to F; an ID of 7 is assigned to transfer of C to D; an ID of 8 is assigned to transfer of C to E; and an ID of 9 is assigned to transfer of C to F. With this, the source, the destination, and the path can be recognized only by decoding the single ID.

Further, the chip that has received frames from the other chip may transmit the frames to the destination in the chip on the basis of those IDs.

Further, each chip may perform, in transmission, parallel-to-serial conversion on data obtained by sampling changes in raw values of signals that flow through the on-chip interconnects. In this example, the receiver chip performs serial-to-parallel conversion on received frame data. With this, the bit width required for chip-to-chip transfer can be reduced.

Further, other exemplary features according to an example of the embodiment of the present invention are as follows:

The chip to chip physical link may transmit and receive frames on the basis of credit-based flow control.

In this case, handshaking using ACK/NAK (Acknowledgement/Negative Acknowledgement) other than credit-based flow control is not performed in communication. Further, frames are transferred irrespective of handshaking used by protocols in the chip.

In frame generation, timestamps may be added to frames.

In frame generation, priority information may be added to frames.

Further, a switch (SW) for path selection configured to select frame paths may be provided, and frames may be transferred via the switch (SW) for path selection. In the switch (SW) for path selection, the wrapper modules, and the chip to chip physical link, virtual channel (VC) or QoS control may be used.

In the case of QoS control, timestamps and priority information may be used.

To achieve the frequency bandwidth suppression and robustness enhancement of electrical transfer, frames may be encoded by 128B/130B or the like.

An error correction value such as an ECC (Error Correcting Code) may be added to frames.

The interconnect for connecting the on-chip blocks (functional blocks), the wrapper modules, and the chip to chip physical link to each other may use any topology such as tree, mesh, or torus.

In chip-to-chip transfer, frames may be aligned to the bit width of the chip to chip physical link or unaligned frames may be transferred with given data filled for the shortage.

When unaligned frames are transferred, a rule for filling is made between the source and the destination in advance. In this case, transmission can be made without the addition of data on marks indicating frame boundaries, and hence the transfer efficiency (frame utilization efficiency) can be enhanced.

In a case where data on marks indicating frame boundaries is required, dedicated line assertion or magic number values may be used as the mark data.

In a single frame, a plurality of sampling values may be included in the directions of the spatial axis (signal values of plurality of sources) and the time axis (information based on signal values obtained at a higher frequency). With this, the transfer efficiency (frame utilization efficiency) can be enhanced.

The source and destination blocks may recognize, from IDs add to frames, the format of the sampling values included in the single frame.

That is, as exemplified in FIG. 10, unique IDs that are added to frames are held in, for example, each chip in association with source functional block specifying information (Src), destination functional block specifying information (Ds), information based on the type of a sampled on-chip interconnect, such as the format (Format) and operating frequency (Freq) of a signal on the on-chip interconnect, and information regarding frame transmission and reception, such as QoS, burst, or the like. The IDs are held in a state that allows the wrapper module in each chip to refer to the IDs.

In this example, the ID is associated with, in addition to the source and destination combination, various kinds of additional information such as the type and frequency of the sampled on-chip interconnect. With this, the plurality of pieces of information can be extracted only by decoding the ID.

In addition, in the embodiment of the present invention, the following are included:

The source and destination blocks and the formats of signals in frames are specified by IDs, and the information such as ID may be statically determined in advance or may be dynamically determined when the setting phase is carried out.

Further, in the present embodiment, a frame with the bare minimum header such as sampled raw value and ID has any length.

The chip to chip physical link may aggregate and transfer frames between the plurality of source and destination combinations.

The bit width of the chip to chip physical link is not limited to any particular width.

In addition, the plurality of chip to chip physical links are provided between a pair of chips.

As the protocol of on-chip interconnects, split transactions in which the command phase and the data phase are split have been mainstream. In a split transaction, transactions are outstandingly operated in parallel, and time (number of cycles) required between the command phase and the data phase and the order of commands and data are variable. The method of the present embodiment is easily applicable to such transactions. A delay smaller than that in the related-art protocol conversion bridge may occur due to the intermediation of the buffer (BUF) in the wrapper module or the switch (SW). At this time, split transactions can be transparently used.

However, there is also signal status transition or source-to-destination handshaking that depends on a fixed cycle. To deal with a case where the chip-to-chip transfer of such a signal is required, there may be a mode in which frames having successive data successively sampled with the fixed cycle (that is, burst) are transferred or a mode in which the successively sampled data is stored in a single frame. Further, a header flag indicating the used transfer mode may be included in the frames. The wrapper module or the switch carries out transfer by referring to the flags, so that the successive sampling values can be transferred between the chips with the fixed number of cycles without interruption. Further, at this time, the same control scheme as VC or QoS control may be used.

The related-art chip-to-chip connection is described as follows:
  The on-chip connection has a drop in data transfer efficiency or an increase in delay due to the connection via the bridge and focuses on limited use.
  The bridge for converting the on-chip interconnect protocols to the chip-to-chip interconnect protocol is used.
  Although the chip has various interconnects, the related-art scheme only supports the conversion of the main on-chip interconnect protocol. To support diverse on-chip protocols, the preparation of as many conversion bridges as the number of types of the protocols is required.
  A chip-to-chip connection needs to be made with transfer serialization with a small bit width due to restrictions on electrical characteristics and cost, and hence the protocol of a dedicated chip-to-chip interconnect having a large conversion overhead is often used.
  Data is serialized or packetized through multi-layer conversion. It is assumed that a serial chip to chip physical link with the limited number of bits (width of approximately from 2 bits to 64 bits) is used.
  In an existing chip-to-chip interface standard, a protocol overhead is approximately from 20% to 30%.

An exemplary signal processing chip that is the subject of the present embodiment may incorporate processors such as CPU, GPU, and DSP (Digital Signal Processor), a functional block configured to perform video compression encoding and decompression decoding, a hard-wired functional block configured to perform image/audio processing and communication processing, a non-volatile developable memory, an interface functional block for connections to various external devices, an A/D (Analog to Digital) converter, a D/A (Digital to Analog) converter, a PHY for a connection to an external memory or an external chip, a PLL (Phase-Locked Loop) configured to perform clock multiplication and synchronization, and the like.

Figure 11:
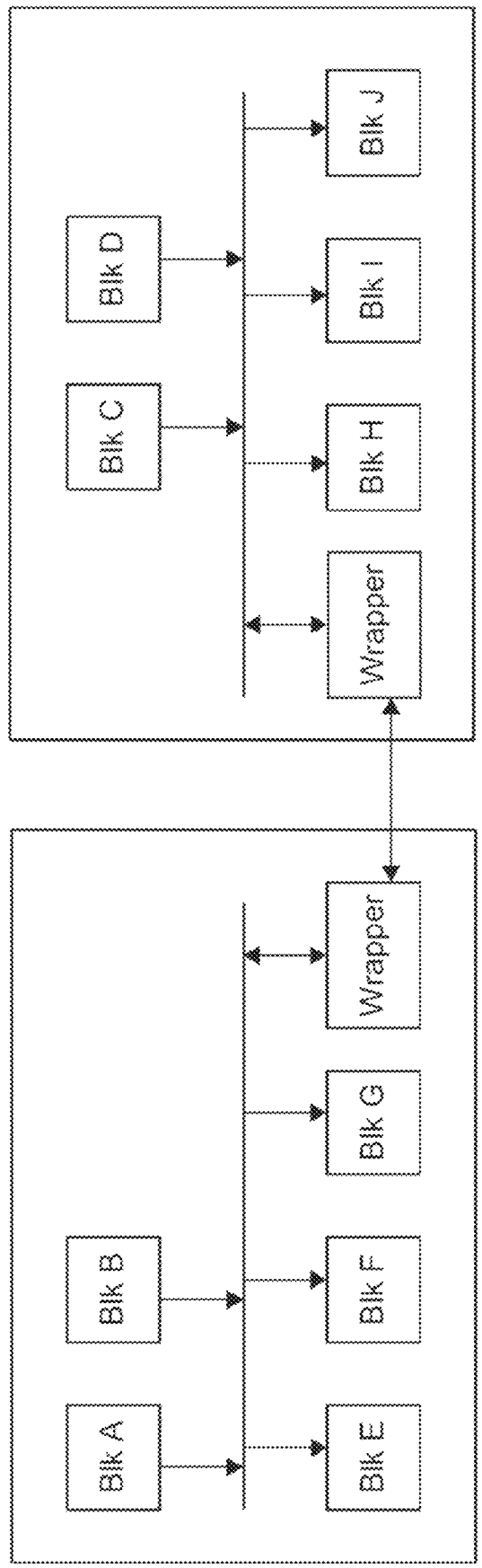
FIG. 11 is an explanatory diagram illustrating a configuration example of the embodiment of the present invention.

That is, as exemplified in FIG. 11, a first chip includes a functional block A (Blk A), a functional block B (Blk B), etc., and a wrapper module (Wrapper) connected to each other by an on-chip interconnect, and a second chip includes a functional block C (Blk C), a functional block D (Blk D), etc., and a wrapper module (Wrapper) connected to each other by an on-chip interconnect. With the chip-to-chip interconnect for connecting such first chip and second chip according to the example of the present embodiment, the wrapper modules each eliminate complex layer conversion, perform digital sampling on signals that flow through the existing on-chip interconnect line, and transfer the signals in a relay manner.

Note that, in this example, it is assumed that a super multi-bit, high-speed chip to chip physical link can be used (in a certain example, an assumed width of approximately from 256 to 2048 bits).

Further, the bit width (frame) of data obtained by sampling by the wrapper module and the bit width of the chip to chip physical link may be the same, and the bits may correspond to each other on a one-to-one basis, or the bit widths may be different from each other. In addition, frames output from the plurality of wrapper modules may be convolved in the same line of the chip to chip physical link.

In a case where a one-to-one connection is made or a simple hard-wired block uses a fixed rule, there is no need to include headers including IDs and the like in frames. Further, in this case, the marks of frame boundaries are also unnecessary.

Figure 12:
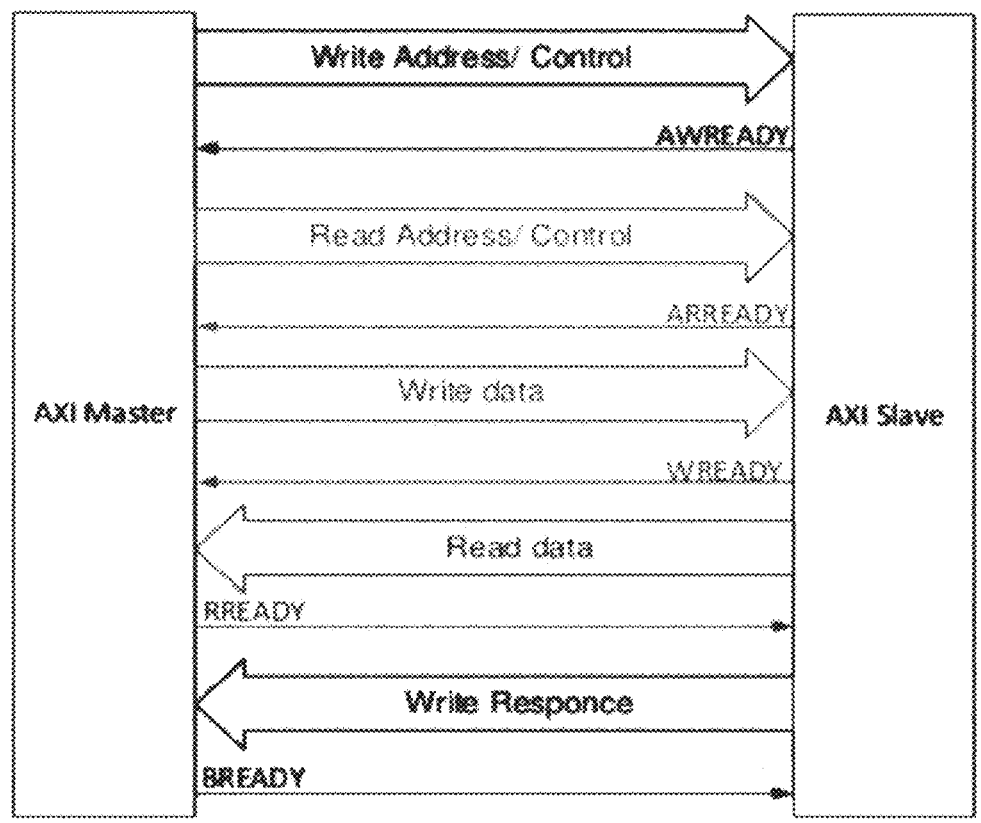
FIG. 12 is an explanatory diagram illustrating an example of a protocol that is used in the embodiment of the present invention.

Further, with regard to sampling timing, the following example as exemplified in FIG. 12 is considered: a functional block serving as an AXI master and a functional block serving as an AXI slave that transmit and receive signals with the AMBA AXI protocol are connected to each other by 56 on-chip interconnects.

At this time, the AXI master transmits write address control and the AXI slave transmits an address writable signal (AWREADY) in response to this. Then, the functional blocks operate as follows:
  The AXI master transmits read address control;
  The AXI slave transmits an address readable signal (ARREADY);
  The AXI master transmits write data;
  The AXI slave transmits a write ready signal (WREADY);
  The AXI slave transmits read data;
  The AXI master transmits a read ready signal (RREADY);
  The AXI slave transmits a write response; and
  The AXI master transmits ready (BREADY).

Figure 13:
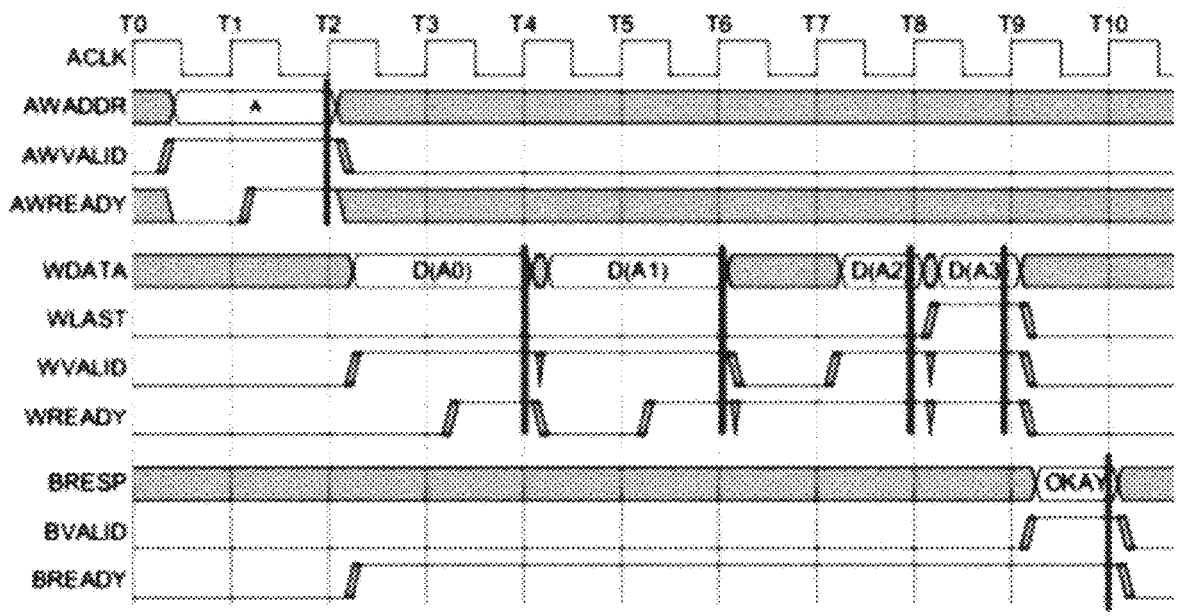
FIG. 13 is an explanatory diagram illustrating an example of a signal timing chart in the embodiment of the present invention.

In this case, the signal timing chart is as exemplified in FIG. 13.

At this time, the wrapper module connected to those on-chip interconnects may sample the values of the 56 lines (56 values) only in a cycle in which there is a change in signal edge of any of the 56 lines, and transmit the values to the wrapper module of another chip. In the example of FIG. 13, sampling in the cycle T7 can be skipped. Note that, the present invention is not limited to this example, and the wrapper module may refer to the active (enable/disable) status of the on-chip interconnect that is a sampling subject to determine cycles in which sampling is unnecessary, and skip sampling (and transmission) in the cycles determined as not needing sampling.

Figure 14:
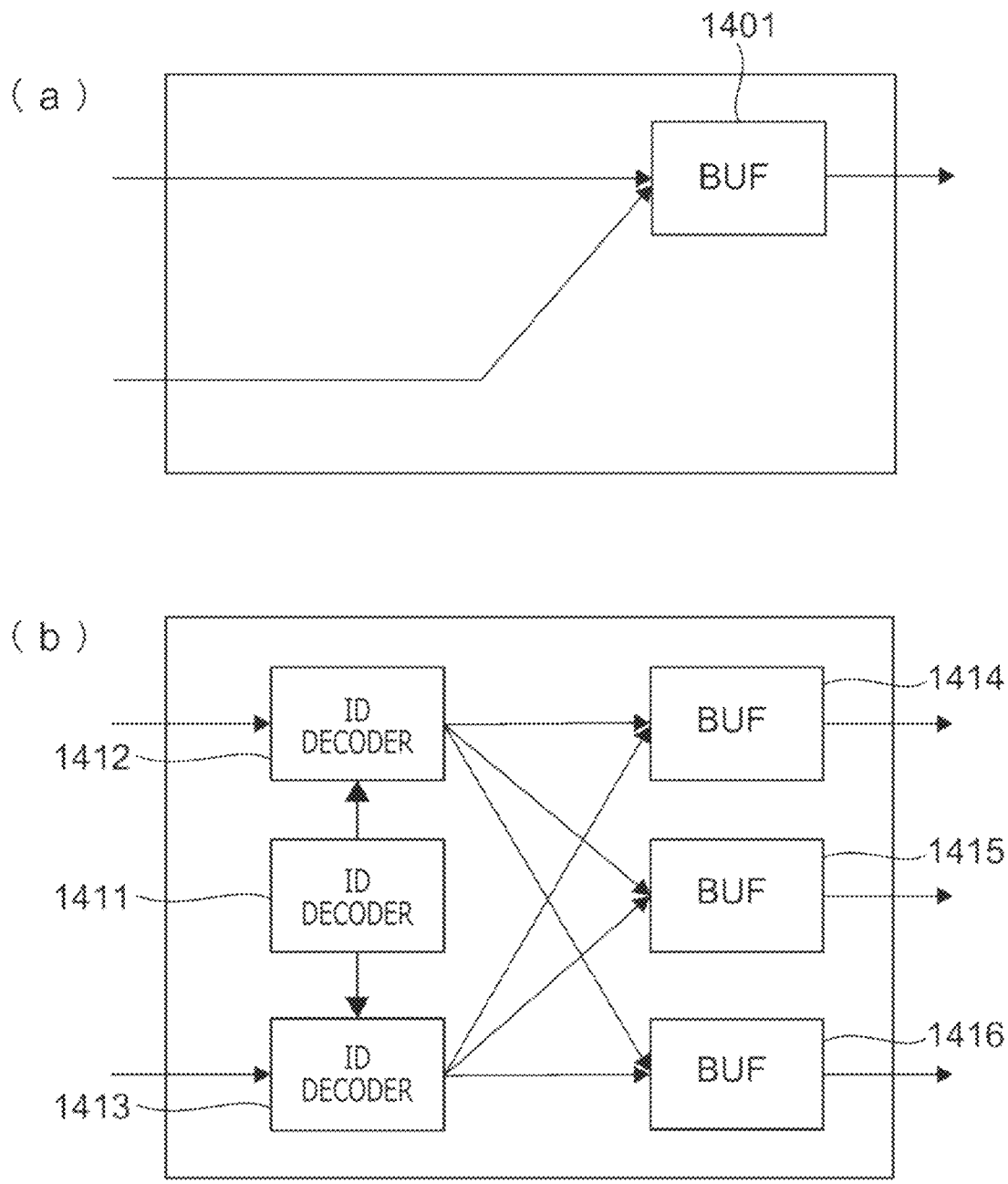
FIG. 14 is an explanatory diagram illustrating a configuration example of a switch that is used in the embodiment of the present invention.

Further, FIG. 14 illustrates a configuration example of the switch SW of the signal processing chip 1. Here, FIG. 14(*a*) illustrates an example of the switch SW configured to receive frames input from the two wrapper modules, sequentially hold the frames in a buffer 1401, and output the frames to the single functional block serving as an output destination. Further, FIG. 14(*b*) illustrates an example including ID decoders 1412 and 1413 that receive frames input from the two wrapper modules, correspond to the respective wrapper modules, and decode the IDs included in the frames by referring to an ID table 1411. In this example, the ID decoders 1412 and 1413 each decode the ID included in the received frames and specify, as a destination, any of the three functional blocks that are output destinations. Then, the ID decoders 1412 and 1413 each output the frames to any of buffers 1414, 1415, and 1416 that corresponds to the functional block specified as the destination.

Figure 15:
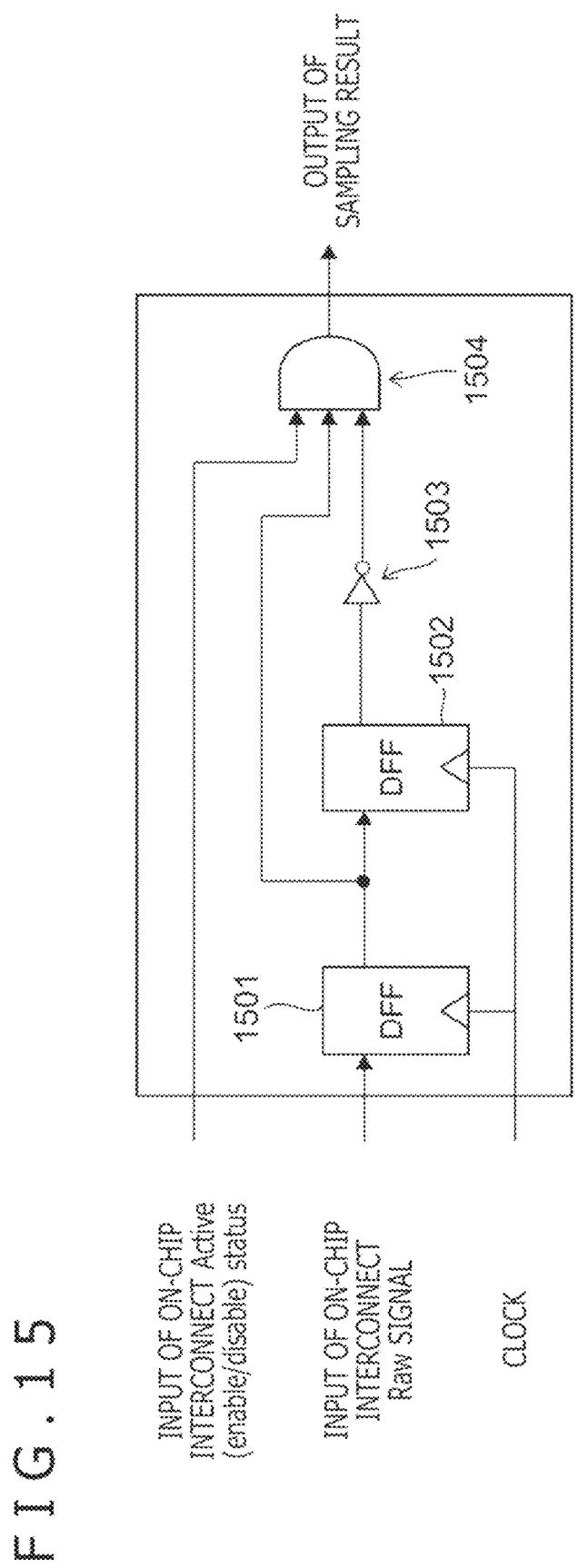
FIG. 15 is an explanatory diagram illustrating a configuration example of a sampling circuit that is used in the embodiment of the present invention.

A circuit for sampling in the wrapper module includes, for example, as exemplified in FIG. 15, a first latch (D flip-flop (DFF)) 1501, a second latch (DFF) 1502, a NOT circuit 1503, and a 3-input AND circuit 1504. The first latch 1501 receives the input of Raw signals in the on-chip interconnect that is a sampling subject. The first latch 1501 latches the received Raw signals at given timing of the clock signal of the on-chip interconnect and outputs the latched signals.

The second latch 1502 latches signals output from the first latch 1501 at given timing of the clock signal of the on-chip interconnect, and outputs the latched signals to the NOT circuit 1503. The NOT circuit 1503 logically inverts input signals and outputs the signals to the AND circuit 1504.

The 3-input AND circuit 1504 receives the active (enable/disable) signal of the on-chip interconnect, the output of the NOT circuit 1503, and the output of the first latch 1501 here, and outputs the AND calculation result of those signals as a sampling result.

With this circuit, there is obtained a circuit configured to output a pulse over the single cycle of the clock frequency in a case where the on-chip interconnect is active and there is a change in Raw signal (signals output from the first and second latches are different from each other).

Note that, in a case where Raw signals that are sampling subjects are clock synchronization signals, no latch is required, and hence the first latch 1501 is not necessarily required in this case.

Figure 16:
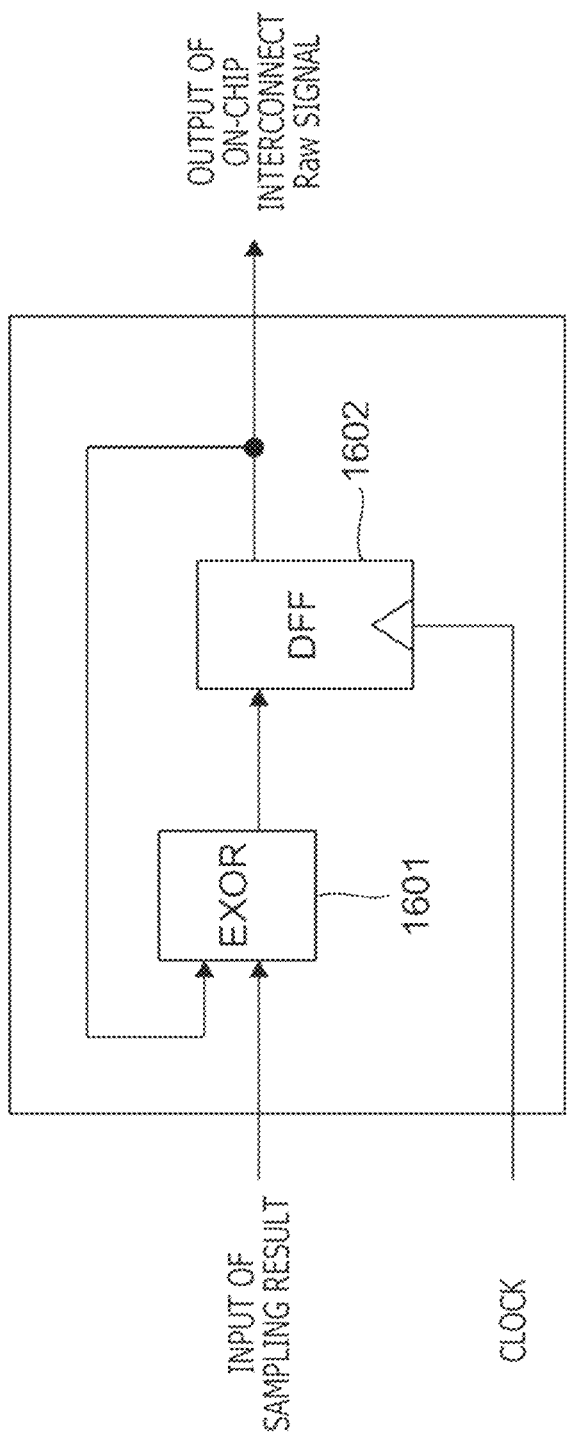
FIG. 16 is an explanatory diagram illustrating a configuration example of an inverse sampling circuit that is used in the embodiment of the present invention.

Further, an exemplary circuit configured to perform inverse sampling (de sampling) includes, as exemplified in FIG. 16, an exclusive OR circuit (EXOR) 1601 and a latch (DFF) 1602. The exclusive OR circuit 1601 receives the input of a sampling result and the output of the latch 1602, which is described below, calculates the exclusive OR of those values, and outputs the calculation result to the latch 1602.

The latch 1602 latches the output of the exclusive OR circuit 1601 at given timing of the clock of the on-chip interconnect and outputs the latched signal. This output is output as the Raw signal of the receiver on-chip interconnect.

With this exemplary inverse sampling circuit, every time the pulse of a sampling result is input, 0/1 of the output of the Raw signal is inverted. Further, in a case where there is no change in successively received sampling results, the same value is continuously output. Note that, in the state in which there is no change in input sampling results, the clock of the inverse sampling circuit may be stopped or the power supply to the sections may be stopped to reduce the power consumption.

Note that, in a case where the clock that is used for sampling and inverse sampling and the clock that is used in the on-chip interconnects are different from each other, a synchronization circuit for synchronizing those clocks may be added to the sampling circuit or inverse sampling circuit described above to synchronize the clock that is used for sampling and inverse sampling with the clock that is used in the on-chip interconnects.

Figure 17:
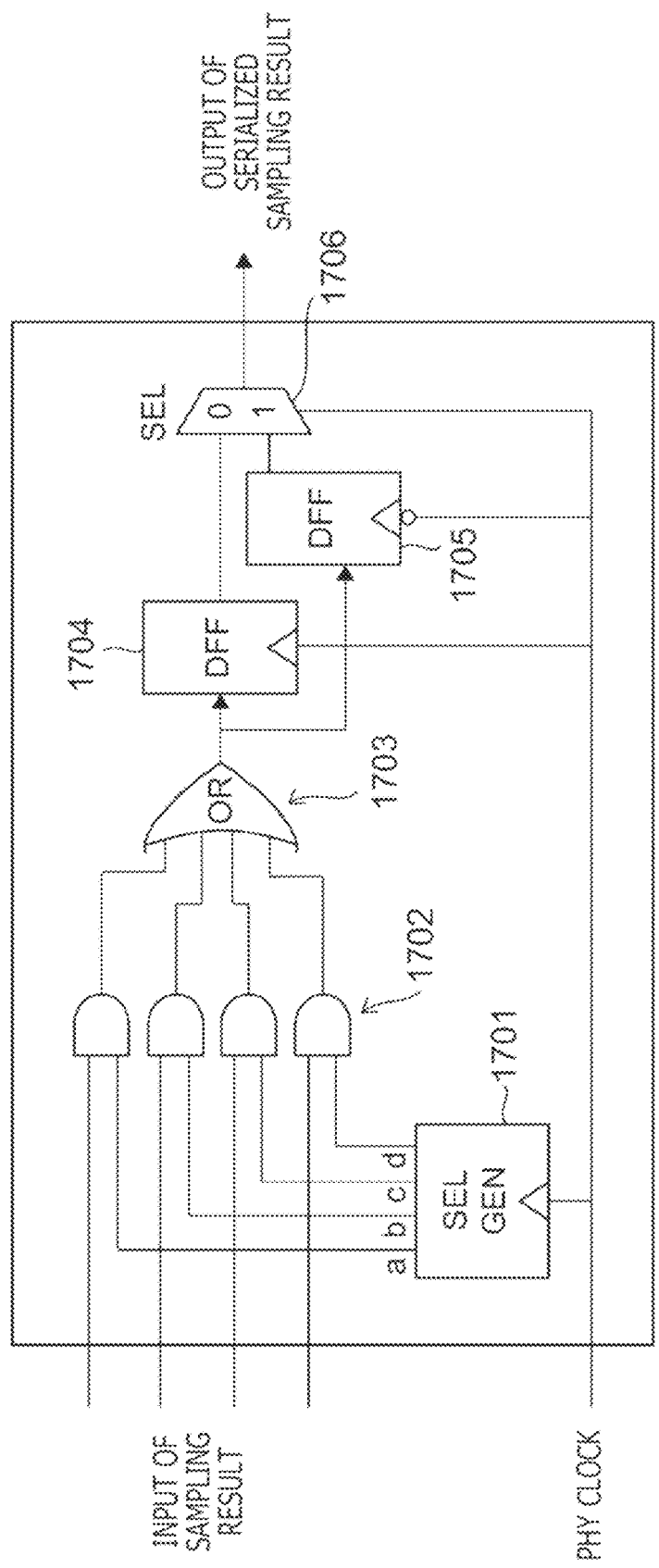
FIG. 17 is an explanatory diagram illustrating a configuration example of a transmission section of the embodiment of the present invention.

A circuit configuration example of a transmission section for transmitting sampled signals is illustrated in FIG. 17.

Figure 18:
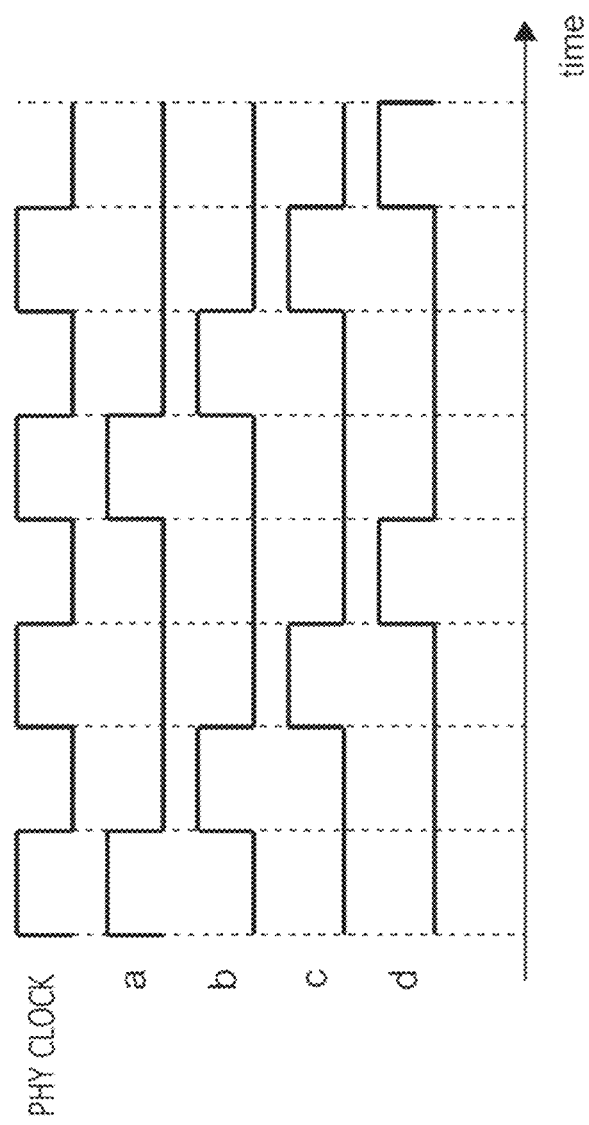
FIG. 18 is an explanatory diagram of a signal output example of a selector generator that is used in the embodiment of the present invention.

FIG. 17 illustrates an example in which 4-bit signals are transmitted. Here, the transmission section includes a selector generator 1701 configured to sequentially set, in response to the input of a PHY clock signal, the output of any of four (corresponding to the number of bits) output signal lines to 1 and the output of the other output signal lines to 0 every clock signal change (FIG. 18), an AND circuit 1702 configured to calculate and output the logical product of a signal corresponding to each bit and a signal from any of the output signal lines of the selector generator 1701, an OR circuit 1703 configured to calculate and output the OR of logical products output from the AND circuit 1702, a first latch (DFF) 1704 configured to latch and output the output of the OR circuit 1703 at given timing of the PHY clock, a second latch (DFF) 1705 configured to latch and output the output of the OR circuit 1703 at given timing of the inverted PHY clock, and a selector 1706 configured to select and output, when receiving the input of the PHY clock, the output of one of the first and second latches 1704 and 1705. According to this example, sampling results corresponding to 4 bits can be serialized to be transmitted.

Figure 19:
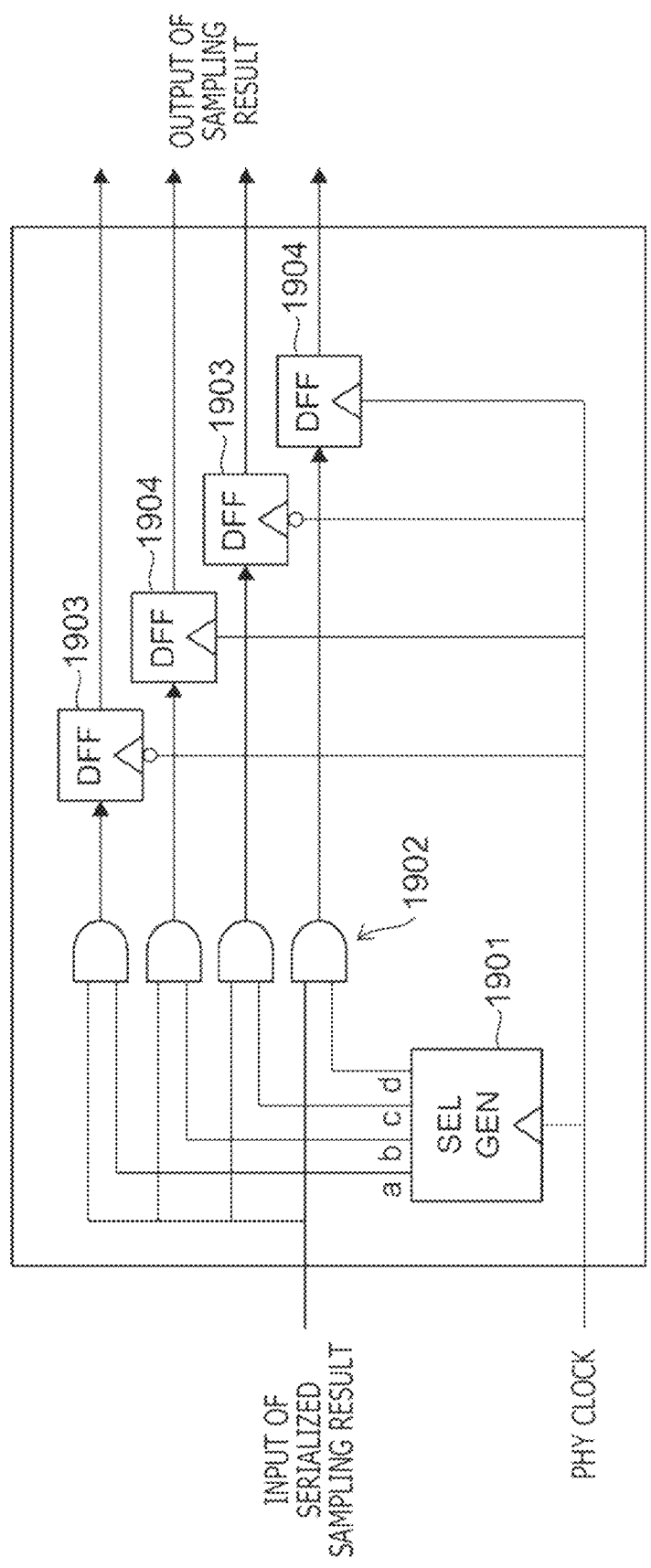
FIG. 19 is an explanatory diagram of a configuration example of a reception section of the embodiment of the present invention.

Further, a circuit configuration example of a reception section configured to receive signals transmitted from this circuit is illustrated in FIG. 19. The circuit exemplified in FIG. 19 includes a selector generator 1901 configured to operate like the selector generator 1701, an AND circuit 1902 configured to calculate and output the logical product of a serialized signal and a signal from any of the output signal lines of the selector generator 1901, a first latch 1903 provided on the signal line corresponding to odd number bits and configured to latch and output signals output from the AND circuit 1902 at given timing of the inverted PHY clock, and a second latch 1904 provided on the signal line corresponding to even number bits and configured to latch and output signals output from the AND circuit 1902 at given timing of the PHY clock. In this circuit, the output of each latch is output as the corresponding sampling result.

In this example of the present embodiment, the frequency of the PHY clock is set higher than that of the clock that is used for sampling and inverse sampling, thereby allowing the same amount of information to be transferred with a smaller bit width in PHY to PHY transfer. According to this example, with P2S (Parallel to Serial) and S2P (Serial to Parallel) conversion, a signal having a 4-bit width in a single phase (Positive clock edge is used) can be transferred as a signal having a 1-bit width in both phases (both Positive and Negative clock edges are used). In this example, the frequency of the PHY clock needs to be at least twice the frequency of the clock that is used for sampling and inverse sampling.

However, on the chip-to-chip transmission line, data for error correction may be added or clock signals may be embedded with 8b/10b transfer or the like. Further, pre-emphasis may be used together. In a case where the effective data transfer efficiency drops as a result of those, the ratio of the frequency of the PHY clock to the frequency of the clock that is used for sampling and inverse sampling may be increased.

Figure 20:
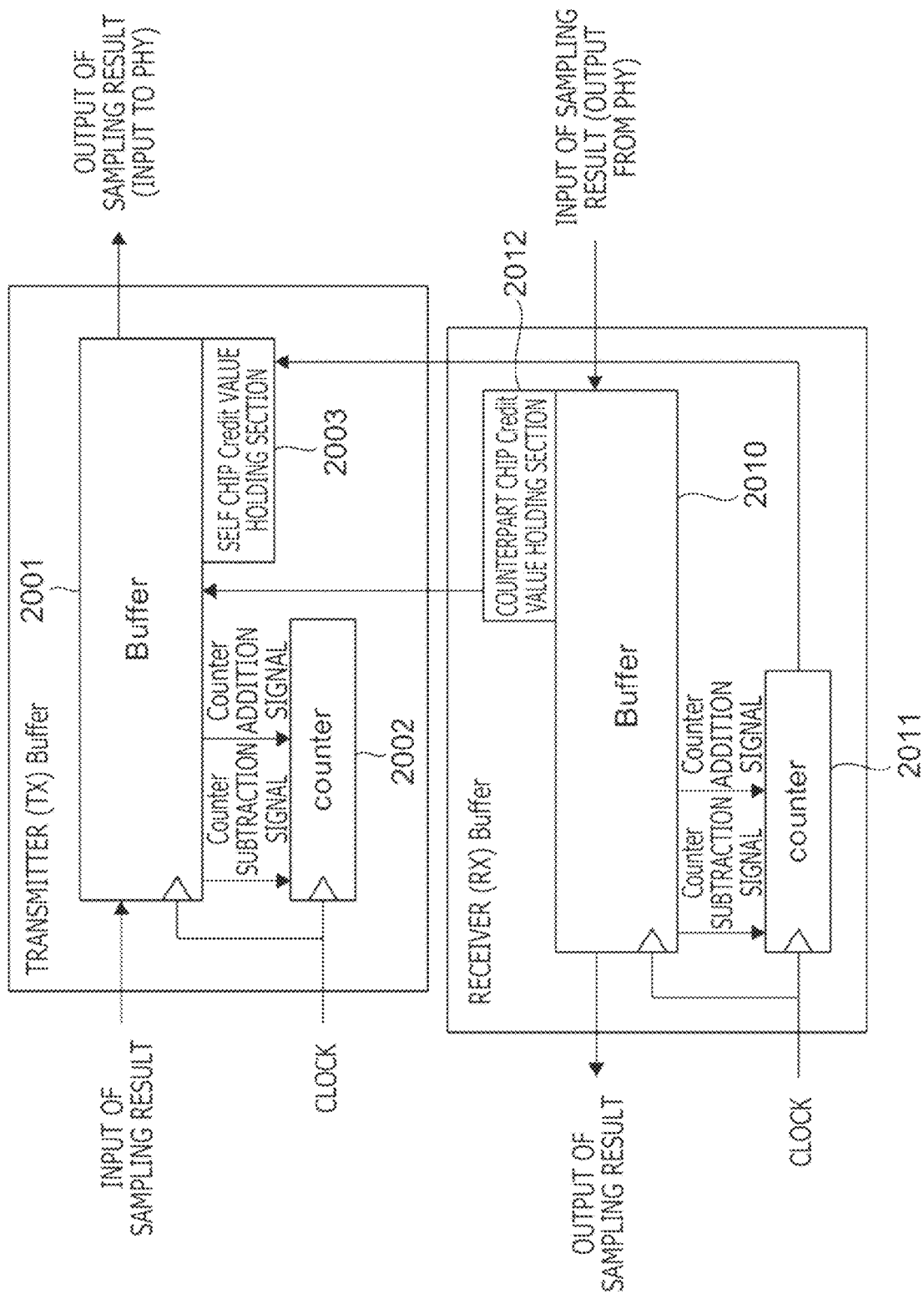
FIG. 20 is an explanatory diagram of configuration examples of buffers of the embodiment of the present invention.

Further, buffer circuits that are used in a certain example of the present embodiment can be realized with configurations exemplified in FIG. 20. The buffer circuits of this example are provided as a pair of transmitter (TX) and receiver (RX) buffer circuits in each chip.

The transmitter buffer circuit includes a buffer section 2001, a counter section 2002, and a self chip credit value holding section 2003. The receiver buffer circuit includes a buffer section 2010, a counter section 2011, and a counterpart chip credit value holding section 2012.

Those buffer circuits temporarily hold data that is transmitted and received by the PHYs (that is, sampling results). When the transmitter buffer circuit confirms that the receiver buffer of the counterpart chip (transmission destination chip) has room on the basis of a value acquired from the counterpart chip credit value holding section 2012, the transmitter buffer circuit outputs, to the PHY, the amount of sampling result data corresponding to the confirmed value.

The transmitter buffer circuit acquires the free space of the receiver buffer in the self chip including the transmitter buffer circuit in question as self chip credit information. The transmitter buffer circuit stores the chip credit information in the self chip credit information holding section 2003, and outputs the chip credit information to the PHY together with sampling results, to thereby notify the counterpart chip of the chip credit information.

The receiver buffer circuit unconditionally receives sampling results from the counterpart chip and holds the sampling results in the buffer section 2010. Here, since the sampling results are transmitted on the basis of credit information, no buffer overflow occurs in the buffer section 2010 of the receiver buffer circuit.

The receiver buffer circuit holds, while receiving the input of sampling results, in the counterpart chip credit value holding section 2012, the free space of the receiver buffer of the counterpart chip inserted on the basis of a rule promised in advance.

Further, the counter sections 2002 and 2011 hold the current amounts of the free space of the corresponding buffer sections 2001 and 2010. In this example, the initial values of the counter sections 2002 and 2011 are set to the amounts of the free space of the corresponding buffer sections.

The counter sections 2002 and 2011 receive counter subtraction signals that become active (a pulse is generated) every time a sampling result is input, or counter addition signals that become active (a pulse is generated) every time a sampling result is output.

Further, every time a counter subtraction signal becomes active (a pulse is input), the value held by the counter section 2002 or 2011 is set to a value obtained by subtraction with the number of active cycles.

Further, every time a counter addition signal becomes active (a pulse is input), the value held by the counter section 2002 or 2011 is set to a value obtained by addition with the number of active cycles.

Further, in this example, the buffer circuits each use, as self chip credit information (that is, the increase or decrease amount of the free space of the buffer section), the current value of the counter or the amount of difference (increase or decrease) from the previous value.

Here, there is described an example in which, as credit information, a counter value indicating remaining buffer capacity or the increase or decrease value of the counter from the previous counter value is inserted into communication data that is transmitted and received between the PHYs. In this example, it is assumed that the bit width of the credit information is approximately from 9 to 32 bits and 1 count is made per approximately 8 to 2048 bytes that are the data size of a sampling result. Thus, the credit information may be inserted into the communication data that is transmitted and received between the PHYs with determined intervals in a fixed manner. Even with this, a sufficiently small overhead is achieved.

Note that, when the bit width of each buffer circuit needs to be, for example, 512 bits, the bit width may be divided by the width of the connected on-chip interconnect or the like (for example, may be divided into 192 bytes, 56 bytes, 36 bytes, and 228 bytes). Further, when there is no pulse in a sampling result and 0 continues in each buffer division, the clock or power supply to the buffer circuit may be stopped. With this, low power consumption can be realized.

Figure 21:
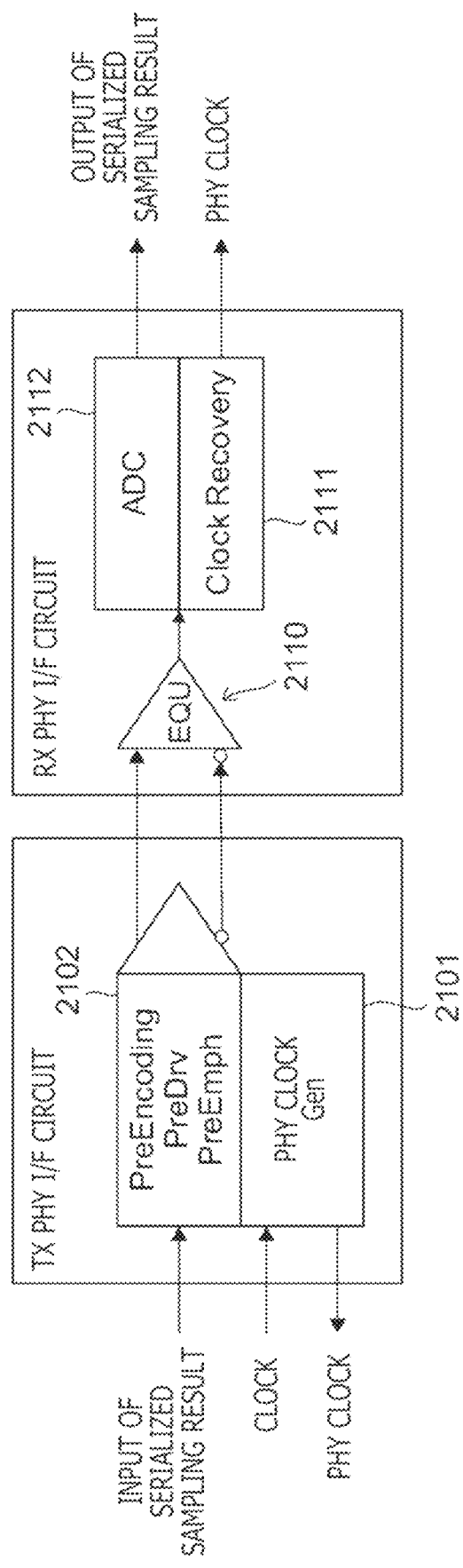
FIG. 21 is an explanatory diagram of configuration examples of PHY (Physical Layer) interfaces of the embodiment of the present invention.

Further, exemplary circuits of PHYs that can be used in the present embodiment are illustrated in FIG. 21. FIG. 21 illustrates a transmitter (TX) PHY interface circuit that is provided in the transmitter chip and a receiver (RX) PHY interface circuit that is provided in the receiver chip. Note that, as described later, each chip may include both the transmitter PHY interface and the receiver PHY interface.

The transmitter PHY interface illustrated in FIG. 21 includes a PHY clock generator 2101 configured to generate PHY clocks and a transmission circuit section 2102 configured to receive the input of serialized sampling results, perform processing such as pre-encoding or pre-emphasis (PreEncoding, PreDrv, or PreEmph), and transmit analog signals via the signal line.

Further, the receiver PHY interface includes an equalizer (EQU) 2110 configured to shape analog signals received via the signal line, a clock reproducing circuit 2111 configured to reproduce PHY clocks, and an ADC 2112 configured to convert analog signals to digital signals.

In this example, an example in which a clock signal is embedded in a data signal to be transmitted and a differential signal pair is transmitted is described. Further, as the modulation method, various modulation schemes such as PAM4 (4-level pulse amplitude modulation) may be employed. In the case of PAM4, 2 bits are transferred per symbol.

In the example of the present embodiment, the PHYs configured to make relatively high-speed telecommunication with use of such a differential signal are used. Further, a clock signal is superimposed on signals on the data line to make telecommunication as in this example, or a clock signal line for transmitting and receiving clock signals may be separately provided. Further, those PHYs may be realized by typical interface circuits configured to make the telecommunication of serialized sampling results with use of single-ended signals, or by circuits configured to make proximity communication by magnetic coupling. In addition, the PHYs may be circuits configured to make optical communication via electrical-to-optical conversion.

FIG. 22 illustrates a schematic example of a circuit configuration when a chip-to-chip interconnect is made between a chip A and a chip B that are the signal processing chips of the present embodiment.

As exemplified in FIG. 22, each chip includes a pair of wrapper modules 2201 and 2202 or 2203 and 2204 and a pair of PHYs 2205 and 2206 or 2207 and 2208.

Further, the wrapper module 2201 of the chip A includes a sampling circuit 2211 and a transmitter buffer 2212, and the PHY 2205 includes a PHY interface circuit 2213.

The wrapper module 2202 of the chip A includes an inverse sampling circuit 2221 and a receiver buffer 2222, and the PHY 2206 includes a PHY interface circuit 2223.

The wrapper module 2203 of the chip B includes an inverse sampling circuit 2231 and a receiver buffer 2232, and the PHY 2207 includes a PHY interface circuit 2233.

The wrapper module 2204 of the chip B includes a sampling circuit 2241 and a transmitter buffer 2242, and the PHY 2208 includes a PHY interface circuit 2243.

The sampling circuit 2211 and the inverse sampling circuit 2221 are connected to the on-chip interconnect of the chip A. In a similar manner, the inverse sampling circuit 2231 and the sampling circuit 2241 are connected to the on-chip interconnect of the chip B. Here, the on-chip interconnects may operate with various different protocols. Further, in the example of the case of FIG. 22, the on-chip interconnects operate with the maximum operating frequency of 1.625 GHz, and the signal lines serve as a 1024-bit (512-bit bidirectional) line on the whole. As in this example, the PHY processes a signal at a QDR (Quad Data Rate: a scheme in which four phases are prepared per cycle, that is, clock phases 0, 90, 180, and 270 degrees are prepared at the same frequency) of 26 GHz, and a signal that is transmitted and received by the PHY interface circuits is a 52 GHz signal having an 8-bit width. Further, PAM4 modulation (4-level pulse amplitude modulation: 2 bits are transferred per symbol) and differential signaling (differential signaling: a scheme in which 1 bit is transferred using differential pair signals, namely, two complementary signals) are employed.

In this example, handshaking or the like is performed with the on-chip interconnect protocols, and the group of those circuits is directly relayed to the counterpart chip without handshaking.

Figure 23:
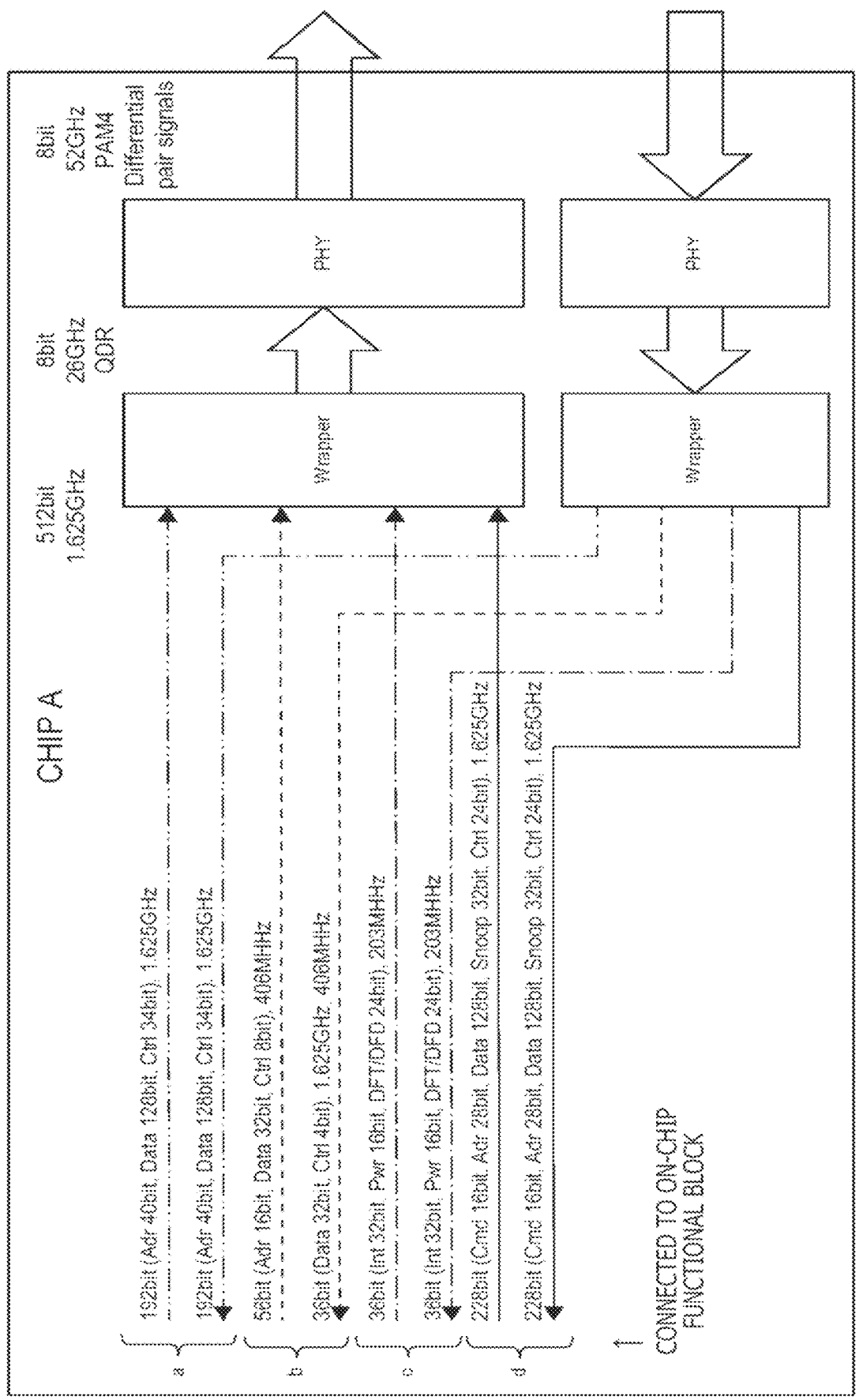
FIG. 23 is an explanatory diagram illustrating a configuration example of the signal processing chip according to the embodiment of the present invention.

In addition, FIG. 23 is a schematic explanatory diagram illustrating an example in which 512 on-chip interconnects with various operating frequencies are input to the wrapper module, sampled with its original 512-bit width, and aggregated into 8 bits by P2S (Parallel to Serial).

a: A network on chip main data interconnect (used for main data transfer and including cache coherence protocol such as AXI, CCI, Infinity Fabric, etc., in some cases) has 192 bits (long dashed double-short dashed line) and an operating frequency of 1.625 GHz.

b: A shared bus MMIO access interconnect has an output of 56 bits, an input of 36 bits (dashed line), and an operating frequency of 406 MHz. This interconnect is used for allowing the CPU or the control core to access the register or memory of each functional block.

c: A system control system interconnect that is a discrete dedicated line has 36 bits (dashed-dotted line) and an operating frequency of 203 MHz. This interconnect is used for transmitting and receiving power management control, DFT/DFD system, interrupt signals, and the like.

d: A unidirectional crossbar block-specific dedicated line has 228 bits (solid line) and an operating frequency of 1.625 GHz. This interconnect is used as a local data bus, a handshake or control line, or the like.

In this example, in the on-chip interconnect having a relatively low operating frequency, signals sampled in the wrapper module may be input to the P2S after the signals have been multiplexed with signals having the highest operating frequency (in this example, 1.625 GHz signals), to reduce the number of signal lines. In this example, since sampling is performed at 1.625 GHz or higher on the basis of signals that operate at 1.625 GHz (a and d), 56 signal lines for a signal b at 406 MHz can be reduced to 14 signal lines and 36 signal lines for a signal c at 203 MHz can be reduced to 5 signal lines by multiplexing. In this case, the signal a has 192 bits, the signal b has 14 bits (obtained by a reduction from 56 bits), the signal c has 5 bits (obtained by a reduction from 36 bits), and the signal d has 228 bits, and the signals have 439 bits (obtained by a reduction from 512 bits) in total. With this, signals on more on-chip interconnects can be transferred with the same PHY bit width.

FIG. 24 is an explanatory diagram illustrating examples of bus cycle transition of those on-chip interconnects. The cycle here is a cycle for the clock operating frequency of the fastest on-chip interconnect. Even in the on-chip interconnects different from the fastest on-chip interconnect, in a case where the same PHY unit is used for sampling result transmission, sampling is performed at the fastest clock frequency of the on-chip interconnects that share the PHY.

Note that, in FIG. 24, "active" indicates a state in which the corresponding on-chip interconnect is used and the signal has a change of 0/1. In this state, a pulse is generated in the sampling circuit (in the wrapper module) for the corresponding on-chip interconnect.

Further, "non-active" indicates a state in which the corresponding on-chip interconnect is used but the signal does not have a change of 0/1 or the corresponding on-chip interconnect is not used (the signal may have a change of 0/1 or there may be a meaningless and ignorable signal fluctuation). In this state, no pulse is generated in the sampling circuit for the corresponding on-chip interconnect. Further, in the non-active state, the clock and power supply to the sampling circuit and the subsequent circuits can be stopped. In this example, low power consumption can be achieved.

Further, an example in which a hybrid interconnect is extended to a 2-chip configuration by utilizing the chip-to-chip interconnect according to the example of the present embodiment is described with reference to FIG. 25.

Figure 25:
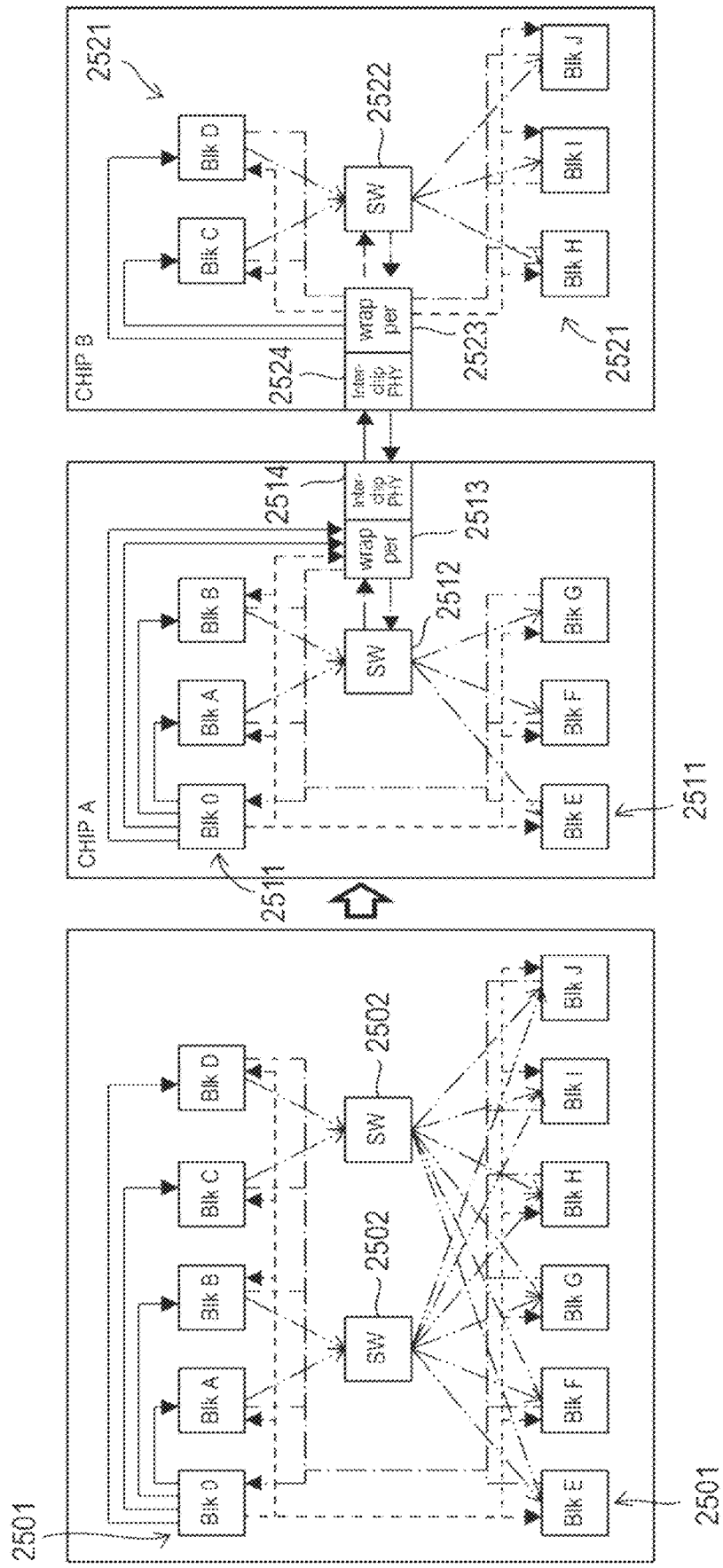
FIG. 25 is an explanatory diagram illustrating an exemplary topology configuration of the embodiment of the present invention.

FIG. 25 illustrates an example in which a chip including 11 functional blocks (Blk 0 to Blk J) 2501 and a switch (SW) 2502 is extended to a 2-chip configuration. The 2-chip configuration can be realized as a configuration including, as examples of the signal processing chip of the present embodiment, a first chip (CHIP A) including six functional blocks (Blk 0, Blk A, Blk B, Blk E, Blk F, and Blk G) 2511, a switch (SW) 2512, a wrapper module 2513, and a chip-to-chip PHY 2514, and a second chip (CHIP B) including five functional blocks (Blk C, Blk D, Blk H, Blk I, and Blk J) 2521, a switch (SW), a wrapper module 2523, and a chip-to-chip PHY 2524.

Note that, in the original single chip, a first switch SW 2502 serves as mediation on the main data interconnect (long dashed double-short dashed line) between the blocks Blk A and Blk B and the blocks Blk E, Blk F, Blk G, Blk H, Blk I, and Blk J. In a similar manner, a second switch SW 2502 serves as mediation on the main data interconnect (long dashed double-short dashed line) between the blocks Blk C and Blk D and the blocks Blk E, Blk F, Blk G, Blk H, Blk I, and Blk J.

The MMIO access interconnect (dashed line) is connected between the functional block Blk 0 and the other functional blocks Blk A to Blk J, and the system control system (dashed-dotted line) is connected between the functional blocks Blk A to Blk J and the functional block Blk 0. In addition, the block-specific dedicated line (solid line) is a unidirectional crossbar local data bus or the like and connected between the functional block Blk 0 and the functional blocks Blk A to Blk D.

In this example, in the 2-chip configuration, on the first chip side, between the switch 2512 and the wrapper module 2513, sampling on the signal line of the main data interconnect is performed and a connection is made for signal output to the signal line of the main data interconnect. Further, the wrapper module 2513 samples signals on the MMIO access interconnect and signals on the block-specific dedicated line, and outputs, to the system control system, system control system signals transmitted from the second chip. Note that, the wrapper module 2513 transmits sampled signals to the second chip via the PHY 2514 and receives signals transmitted from the second chip via the PHY 2514.

Further, on the second chip side, between the switch 2522 and the wrapper module 2523, sampling on the signal line of the main data interconnect is performed and a connection is made for signal output to the signal line of the main data interconnect. Further, the wrapper module 2523 outputs signals on the MMIO access interconnect and signals on the block-specific dedicated line, which have been transmitted from the first chip, to the corresponding interconnects. The wrapper module 2523 samples signals on the system control system interconnect and outputs the signals to the PHY 2524. Note that, the wrapper module 2523 transmits sampled signals to the first chip via the PHY 2524 and receives signals transmitted from the first chip via the PHY 2524.

Further, when the signal lines of the on-chip interconnects are routed in the chip to connect the on-chip interconnects to the single wrapper module as in this example, the layout efficiency in the chip may be deteriorated, so that the design efficiency, the power efficiency, the area efficiency, and the like drop in some cases. In such a case, the following configuration can be taken to enhance the wiring efficiency in the chip.

Figure 26:
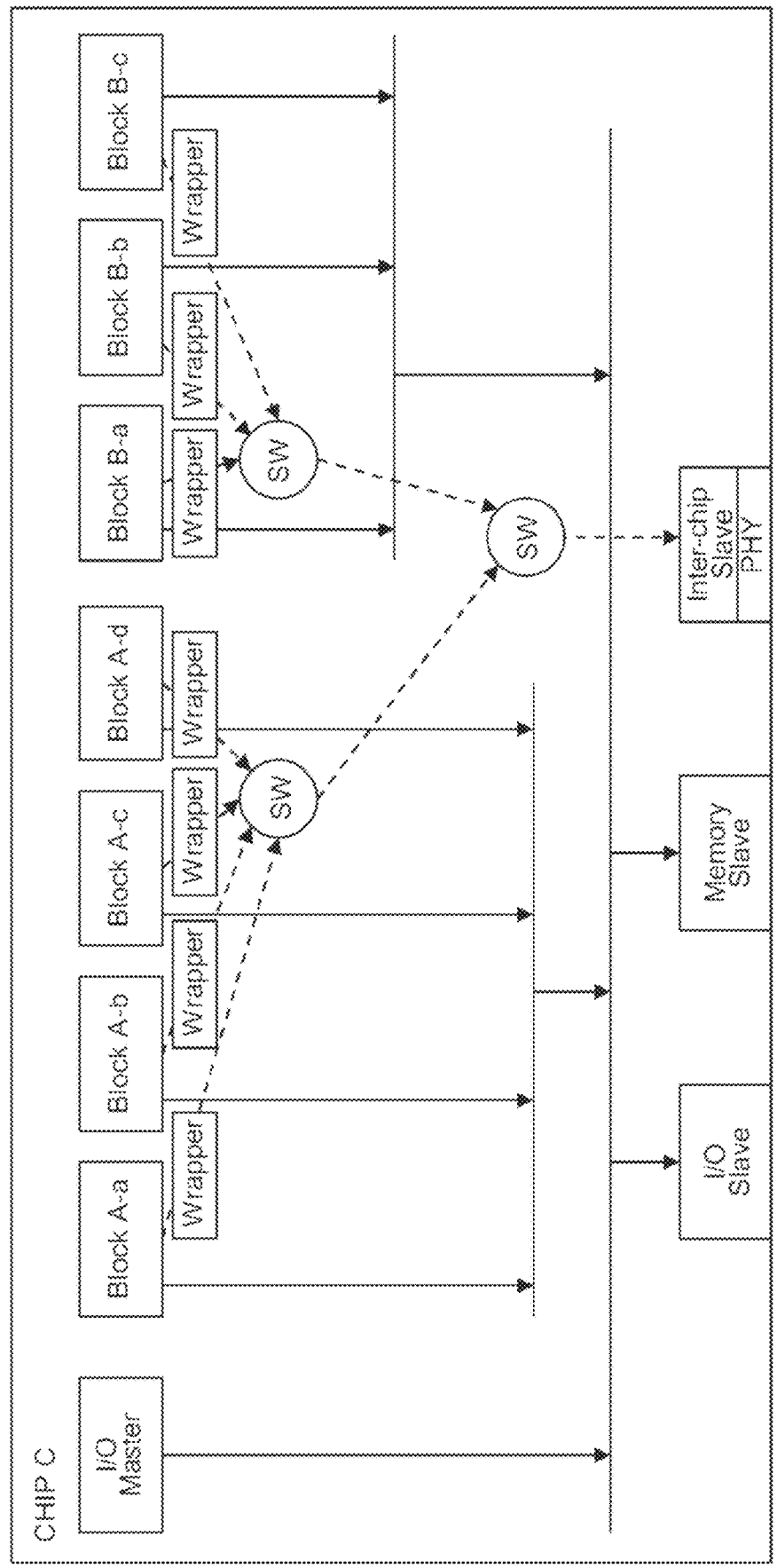
FIG. 26 is another explanatory diagram illustrating an exemplary topology configuration of the embodiment of the present invention.

That is, in an example of the present embodiment (a first case in which a tree topology is added to a multi-layer bus on-chip interconnect), as exemplified in FIG. 26, near each functional block, a wrapper module (Wrapper) configured to sample signals on the output signal line from the corresponding functional block is disposed. That is, in this example, the location where the wrapper module is inserted (frame conversion location) is immediately below the output of each functional block.

Since the plurality of source functional blocks (wrapper modules) are provided, wrapper modules for multi-node connection are used to add IDs irrespective of the number of destination functional blocks.

In this example, in a case where the functional blocks employ output interconnect standards different from each other, the signal lines are routed in the chip through the corresponding wrapper modules and then output to the PHY via an inter-chip slave. In FIG. 26, the paths indicated by the dashed lines correspond to the newly added topology.

Figure 27:
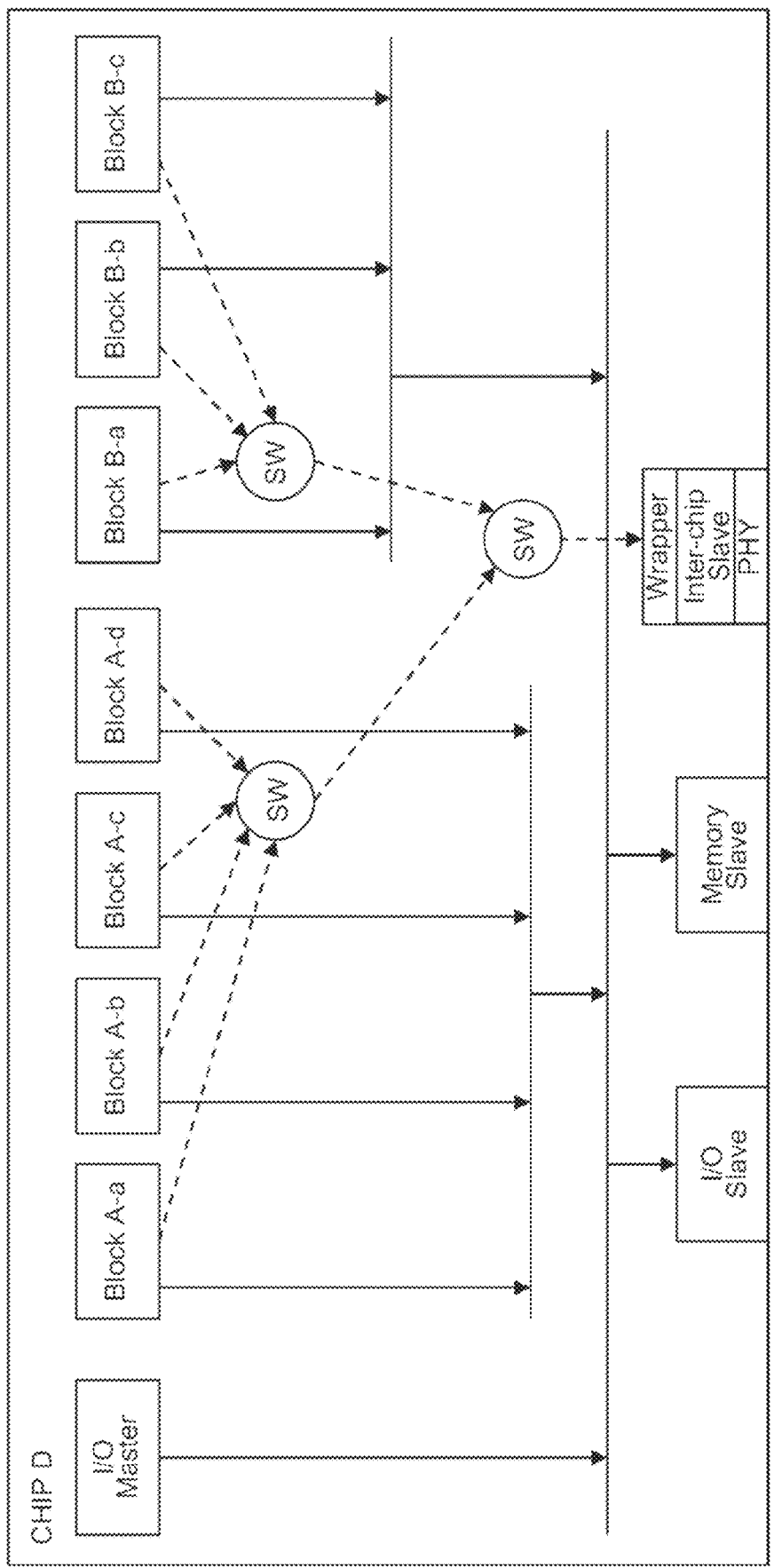
FIG. 27 is still another explanatory diagram illustrating an exemplary topology configuration of the embodiment of the present invention.

Further, in another example of the present embodiment for enhancing the wiring efficiency in the chip (a second case where a tree topology is added to a multi-layer bus on-chip interconnect), as exemplified in FIG. 27, the signal lines of the on-chip interconnect are connected from the functional blocks to the wrapper module (Wrapper) via the switch SW. On those paths, a typical on-chip interconnect protocol may be used.

In this example, the location where the wrapper module (Wrapper) is inserted (frame conversion location) is immediately before the chip to chip physical link. In this example, since the single source wrapper module (Wrapper) is used, a wrapper module for one-to-one node connection may be used.

However, when the counterpart chip includes a plurality of wrapper modules or functional blocks serving as destinations, a wrapper module for multi-node connection is used to add IDs. Also in FIG. 27, the paths indicated by the dashed lines correspond to the newly added topology.

Note that, when the output interconnect standards of the functional blocks are the same and support QoS/VC, it is only necessary that the originally used on-chip interconnect be routed in the chip.

Further, the examples exemplified in FIG. 26 and FIG. 27 are the case where the tree topology is added, but as the on-chip interconnect added to connect the functional blocks, wrapper modules, and chip to chip physical link in the chip, another topology such as mesh or torus may be used, other than the tree topology.

Further, in the examples exemplified in FIG. 26 and FIG. 27, to facilitate the description, only the direction of transmission from the functional blocks via the PHY is illustrated, but there may be a connection in the reverse direction as a matter of course. In this case, as the switch (SW), the two unidirectional switches (SW) are provided to support bidirectional communication.

Figure 28:
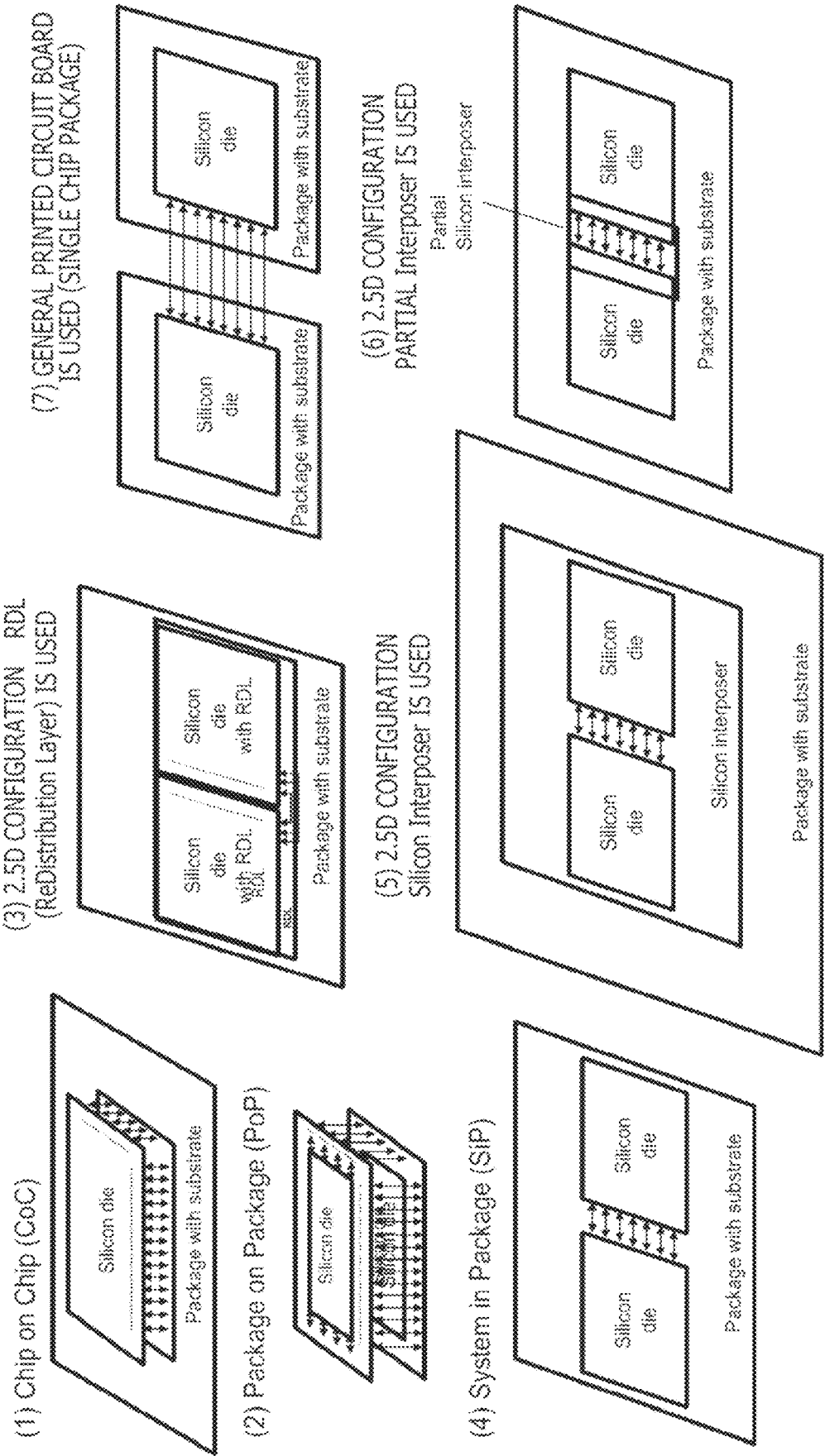
FIG. 28 is an explanatory diagram illustrating package configuration examples according to the embodiment of the present invention.

Further, now, exemplary GPU configuration methods and the like using the embodiment of the present invention is described. A package including the plurality of signal processing chips of the present embodiment may be configured as exemplified in FIG. 28: (1) the plurality of chips are stacked in a single package (CoC: chip on chip), (2) the chips are configured as packages and the packages are stacked (PoP: Package on Package), or (3) an RDL (Re-Distribution Layer) is disposed on the substrate of a package, and the two signal processing chips of the present embodiment are disposed on this RDL (exemplary 2.5D configuration).

In addition, (4) the two signal processing chips of the present embodiment may be planarly disposed on the substrate of a package. Further, (5) a silicon interposer may be disposed on the substrate of a package, and the two signal processing chips of the present embodiment may be disposed on the silicon interposer (another exemplary 2.5D configuration). Note that, (6) the silicon interposer does not necessarily cover the entire signal processing chips and may cover the portion in which the chip-to-chip interconnect is wired (still another exemplary 2.5D configuration: partial silicon interposer). In addition, (7) the signal processing chips may be configured as individual packages.

Figure 29:
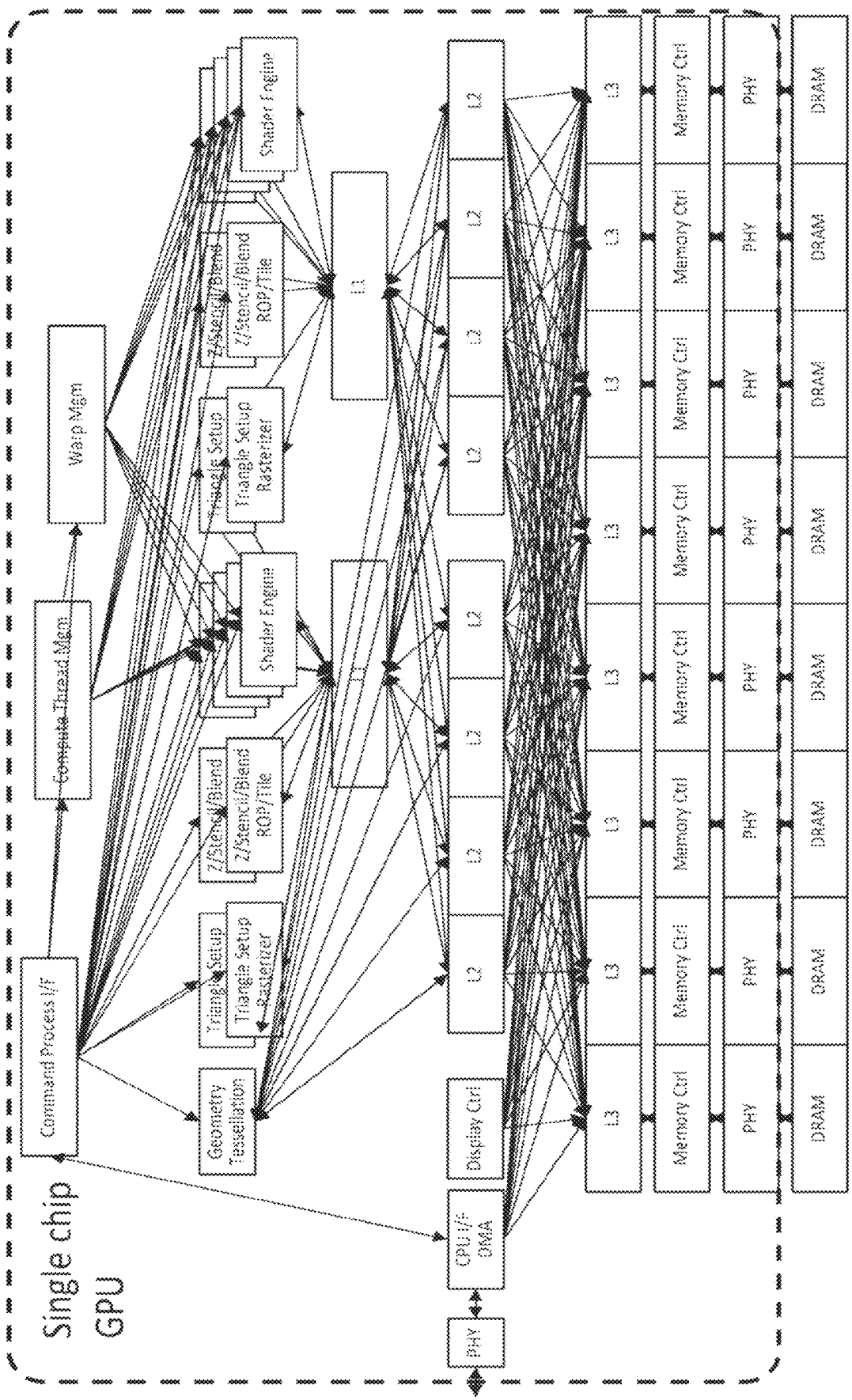
FIG. 29 is an explanatory diagram illustrating an exemplary GPU (Graphics Processing Unit) configuration method of the embodiment of the present invention.
Figure 30:
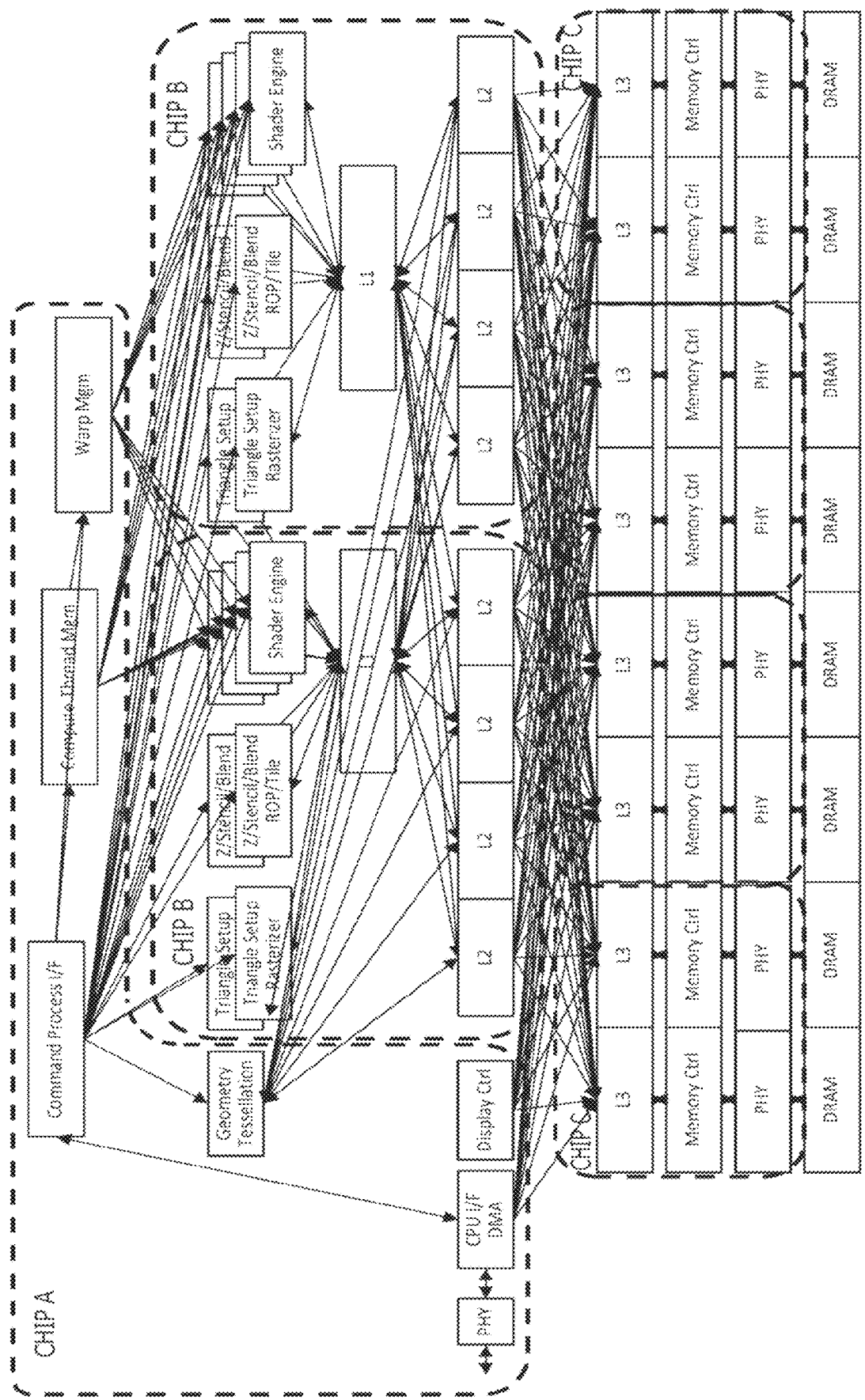
FIG. 30 is another explanatory diagram illustrating an exemplary GPU configuration method of the embodiment of the present invention.

An example in which the configuration of a GPU is realized using the signal processing chip of the present embodiment is described next. A GPU of the related-art example (exemplary single chip) that is the subject of this example is, as illustrated in FIG. 29, a single GPU including functional blocks and configured as a monolithic chip. An increase in size is inevitable to enhance the performance, and thus the obtained chip only focuses on specific performance and functional requirements. Thus, the signal processing chip of the present embodiment is provided in each area within the dashed line to divide the GPU into a first chip (chip A) including a command processor, a second chip (chip B) including shader engines and the like, and a third chip (chip C) including memory controllers (FIG. 30). Note that, the plurality of chips B and C are included in the example of FIG. 30, and a GPU equivalent to the GPU exemplified in FIG. 29 is realized with the combination of the single chip A, the two chips B, and the four chips C.

More specifically, the chip A mainly incorporates a Graphics/Compute frontend and a management processing control system. The chip A includes a processing system over the entire GPU that is relatively difficult to parallelize. The chip A may integrate an I/O (Input/Output) hub die.

The chip A mainly includes a logic circuit configured to operate at the next highest speed after the chip B and is integrated with, as needed, an I/O Hub chip serving as a hub for the on-chip interconnects or peripheral I/Fs (Interfaces) for connecting the chips to each other. The chip A is designed with a combination that gains the maximum benefit of employing a cost-effective logic circuit silicon process.

Further, the chip B mainly incorporates the shader engines (Unified Shaders or programmable graphics calculators), rasterizers, render backends (raster operations such as Z, Stencil, or Blend), a local memory, L0, L1, and L2 caches, and the like. The chip B mainly has the functions with relatively high calculation parallelism. Specifically, the chip B mainly includes calculators, hard-wired logics, and the L0 and L1 high-speed caches that are intended to operate at high speed. The chip B is designed with a combination that gains the maximum benefit of chip area and performance (operating frequency and power consumption) when the finest high performance logic circuit silicon process is employed.

The chip C mainly includes PHYs and large-capacity cache memories (on-chip SRAM (Statistic Random Access Memory), eDRAM (embedded Dynamic Random Access Memory), MRAM (Magnetic RAM), FeRAM (Ferroelectric RAM), or the like). For the chip C, a silicon process favorable to the integration of the analog circuits such as PHY and the large-capacity on-chip memories (SRAM, eDRAM, MRAM, FeRAM, or the like) is employed.

Note that, this example is an example and, for example, the function of the chip B may be multiplexed, the chip A may be eliminated, and the chip B may also have the function of the chip A.

Figure 31:
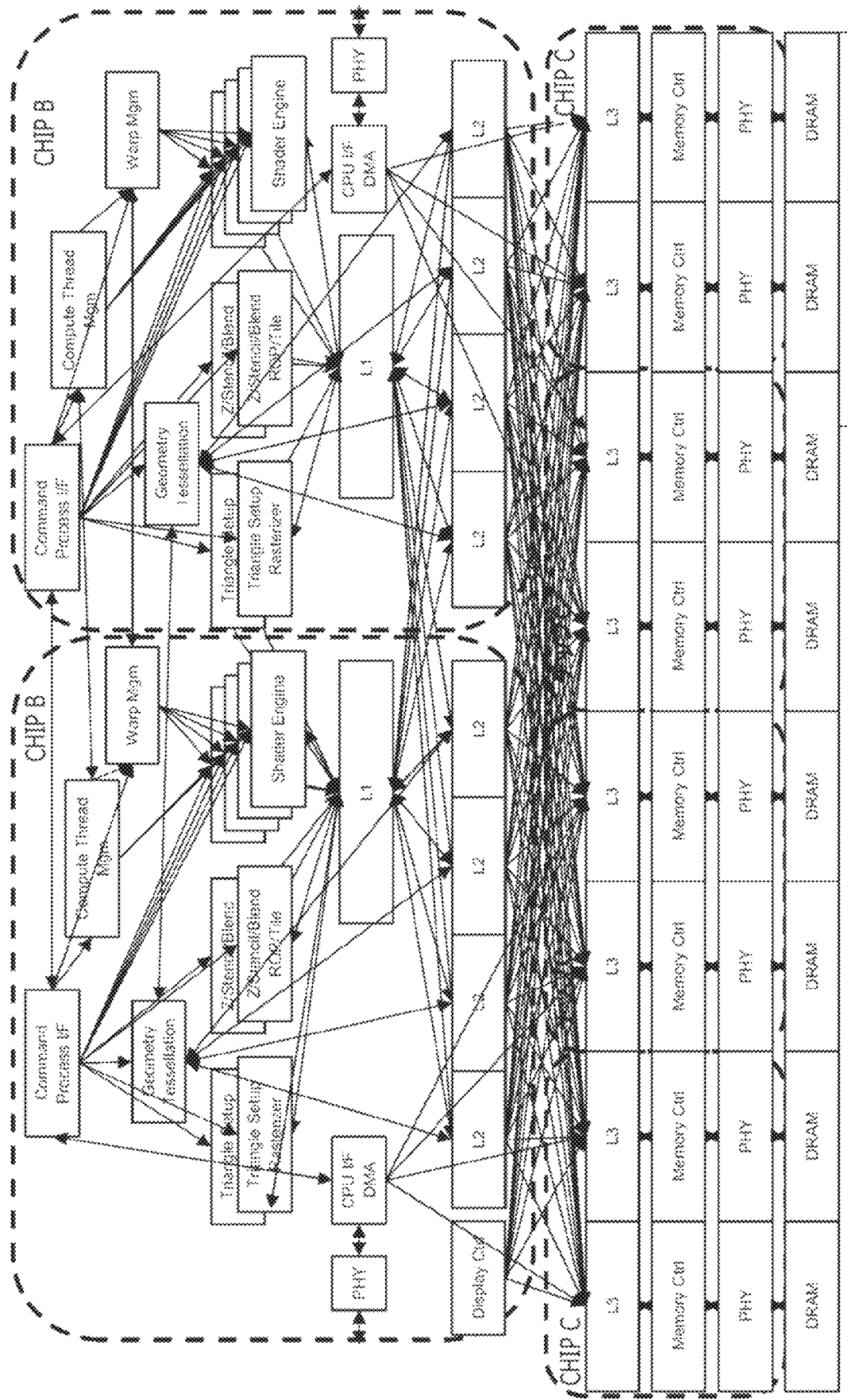
FIG. 31 is still another explanatory diagram illustrating an exemplary GPU configuration method of the embodiment of the present invention.

This example is illustrated in FIG. 31. FIG. 31 illustrates another exemplary division method. In the example of FIG. 31, each area within the dashed line corresponds to the signal processing chip of the present embodiment, and the two chips B each including a command processor, shader engines, and the like and four chips related to memory controllers are combined.

In this way, a plurality of division methods are conceivable as the method of realizing a single GPU, and hence the performance and function of a system can be flexibly set with the adjustment of the system configuration including changing the number of chips to be connected.

Figure 32:
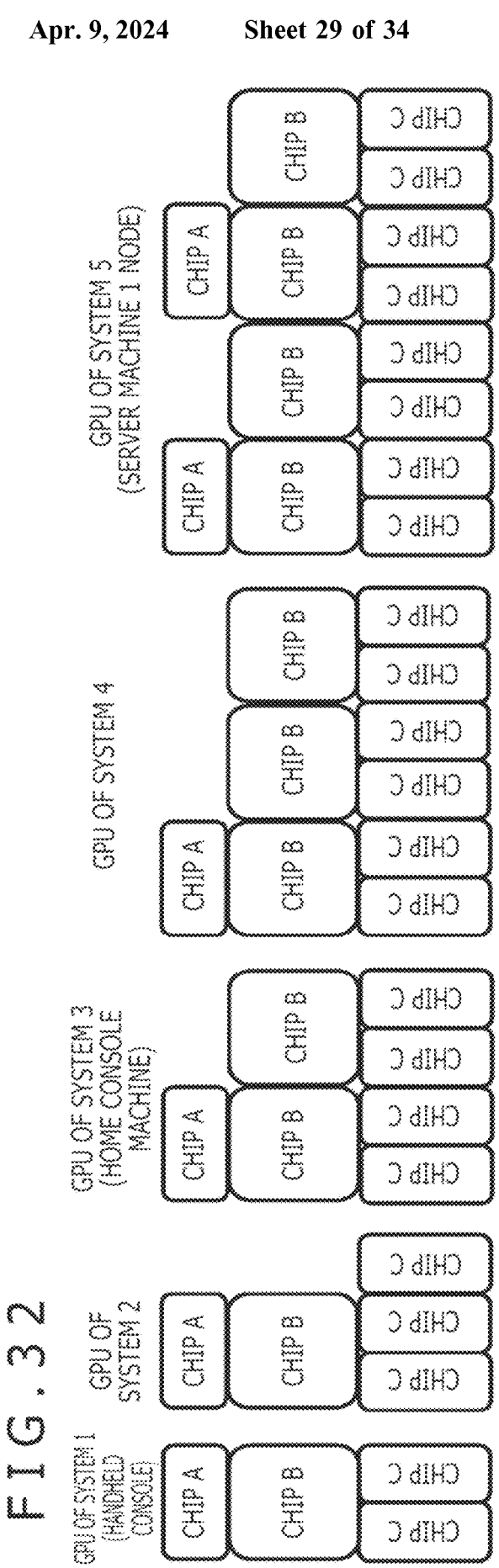
FIG. 32 is an explanatory diagram illustrating an exemplary package configuration method according to an exemplary GPU configuration method of the embodiment of the present invention.

For example, as exemplified in FIG. 32, it is conceivable that a handheld console of a video game console or the like includes the single chip A, the single chip B, and the two chips C, for example. At this time, a typical GPU for a PC (Personal Computer) may include the single chip A, the single chip B, and the three chips C. Further, a home video game console or the like may include the single chip A, the two chips B, and the four chips C, and a higher-performance GPU may include the single chip A, the three chips B, and the six chips C.

A server machine or the like includes the two chips A, the four chips B, and the eight chips C to enhance its performance.

Note that, in those, the chips A, B, and C each incorporate, on the basis of the number of counterpart chips that may be connected, the number of wrapper modules (Wrappers) required for on-chip interconnect connection. In a case where a system configuration includes the combination of the chips less than the number of maximum connectable chips, some incorporated wrapper modules (Wrappers) may be unused.

Further, with the configuration including the single chip A, the two chips B, and the four chips C, a GPU having this configuration may be configured as a package having a 2.5D configuration using an RDL and connected to another package including an I/O hub chip or the like, a DRAM, or the like (FIG. 33(a)). With the configuration including the two chips A, the four chips B, and the eight chips C, the single chip A, the two chips B, and the four chips C may be configured as a single package having a 2.5D configuration utilizing a silicon interposer, and the thus obtained two packages may be connected to each other by the chip-to-chip interconnect to obtain a single GPU (FIG. 33(b)). Note that, the CPU chip in each example may also be configured using the signal processing chip of the present embodiment, and, in such a case, for example, the CPU portion may have a 2.5D configuration using an RDL.

Figure 34:
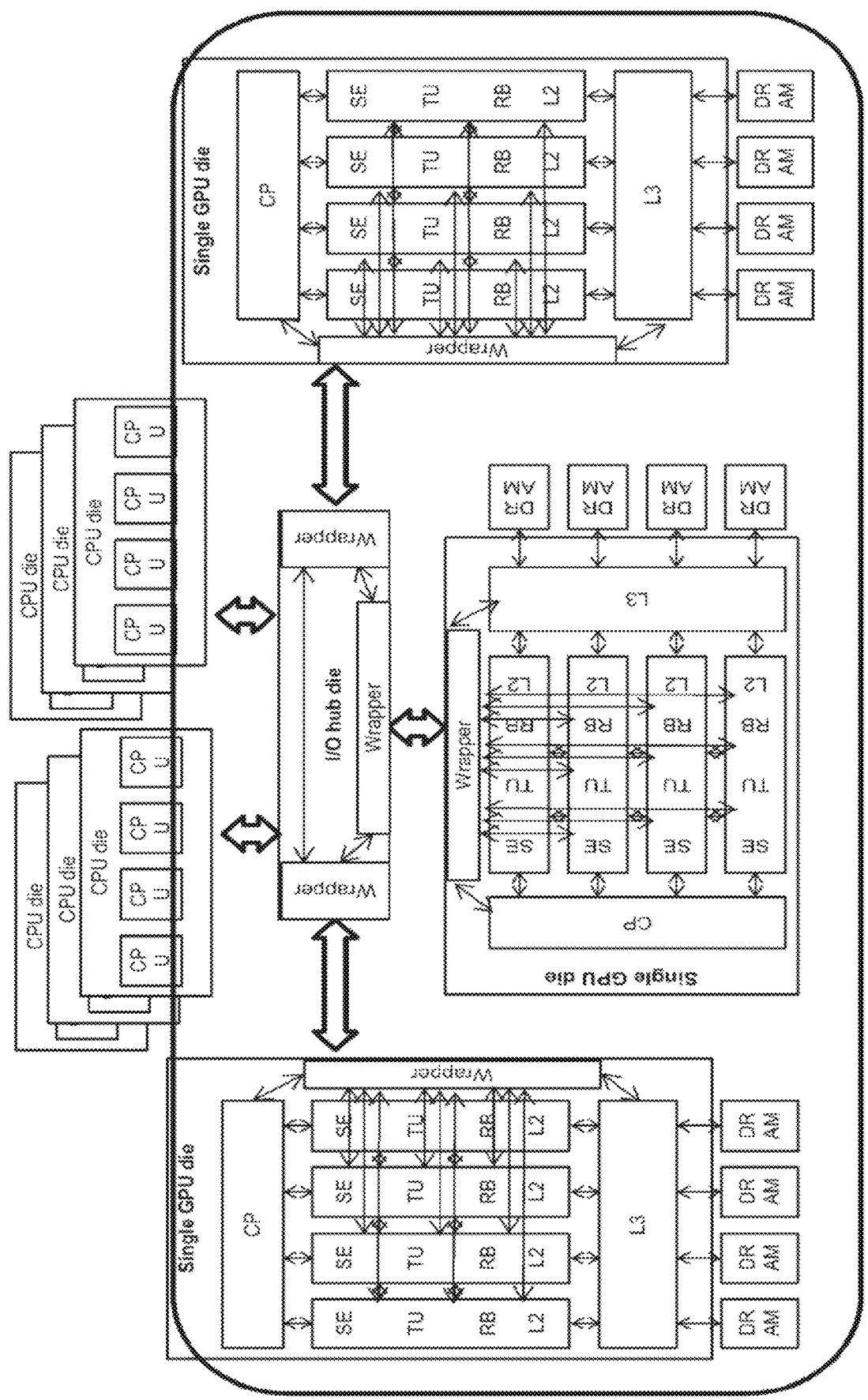
FIG. 34 is still another explanatory diagram illustrating an exemplary GPU configuration method of the embodiment of the present invention.

Further, in a certain example using the signal processing chip of the present embodiment, as illustrated in FIG. 34, the wrapper modules are also disposed in an I/O hub chip, and a plurality of GPUs (those GPUs each also include the wrapper module) may be connected to each other by the chip-to-chip interconnects. In this example, the plurality of GPUs can be made to operate as if a single huge GPU is operated.

Hitherto, the development of dedicated software has been essential to use a plurality of GPUs. According to the example utilizing the signal processing chip of the present embodiment, however, a single huge GPU can be virtually realized by a plurality of relatively small-scale GPUs. With this, while the performance scalability (that is, the architecture that can be used for servers and consoles in common) is achieved with the adjustment of the number of silicon dies to be connected, the chip utilization can be enhanced by application multi-tenancy or the like.

Figure 35:
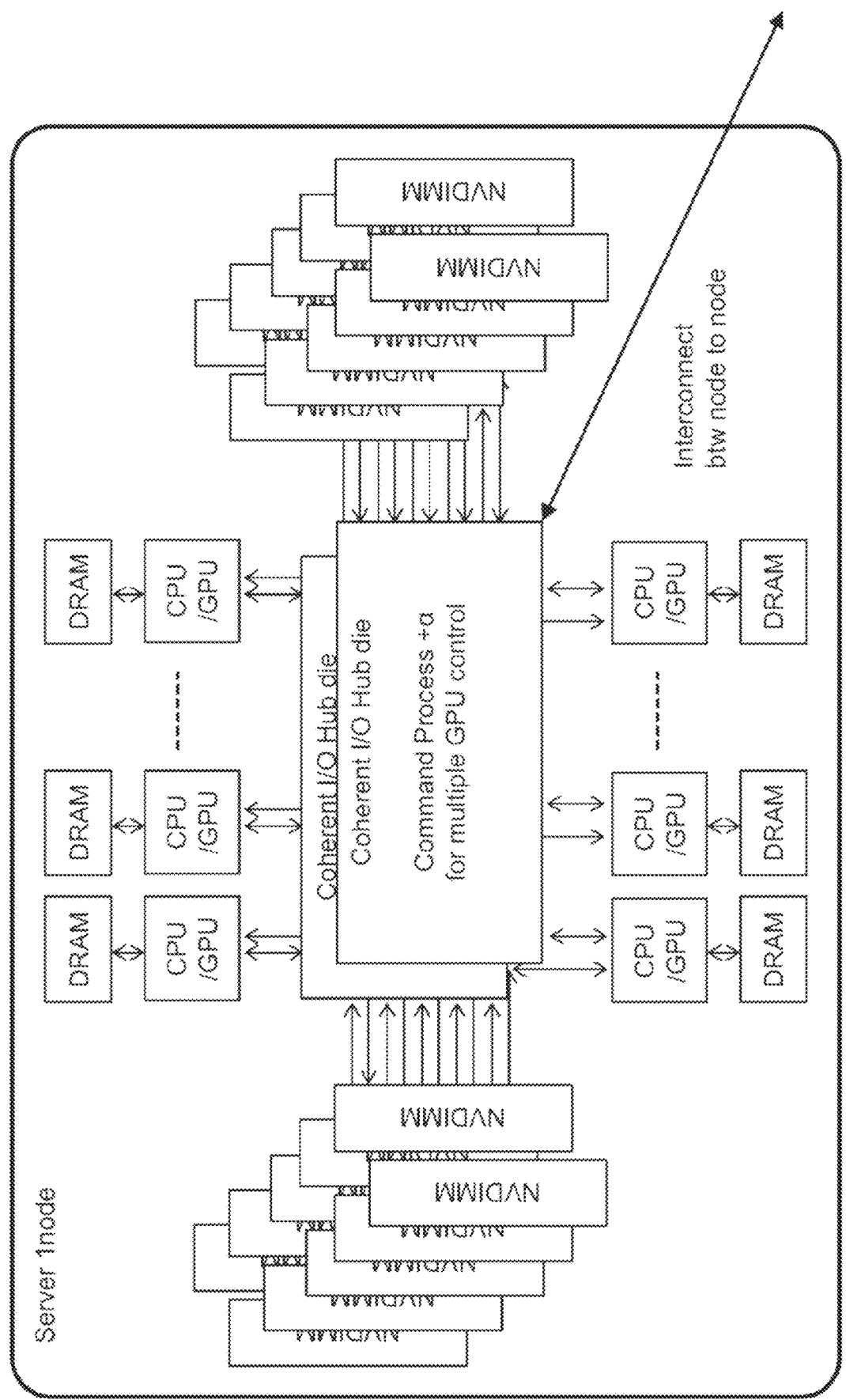
FIG. 35 is yet another explanatory diagram illustrating an exemplary GPU configuration method of the embodiment of the present invention.

Further, an example in which coherence I/O hub dies each incorporate the chip A described above and CPUs/GPUs each incorporate the chips B and C and a CPU is illustrated in FIG. 35. In this example, the wrapper module according to the example of the present embodiment is inserted between the coherence I/O hub and the CPU/GPU, so that a chip-to-chip interconnect is made therebetween.

Figure 36:
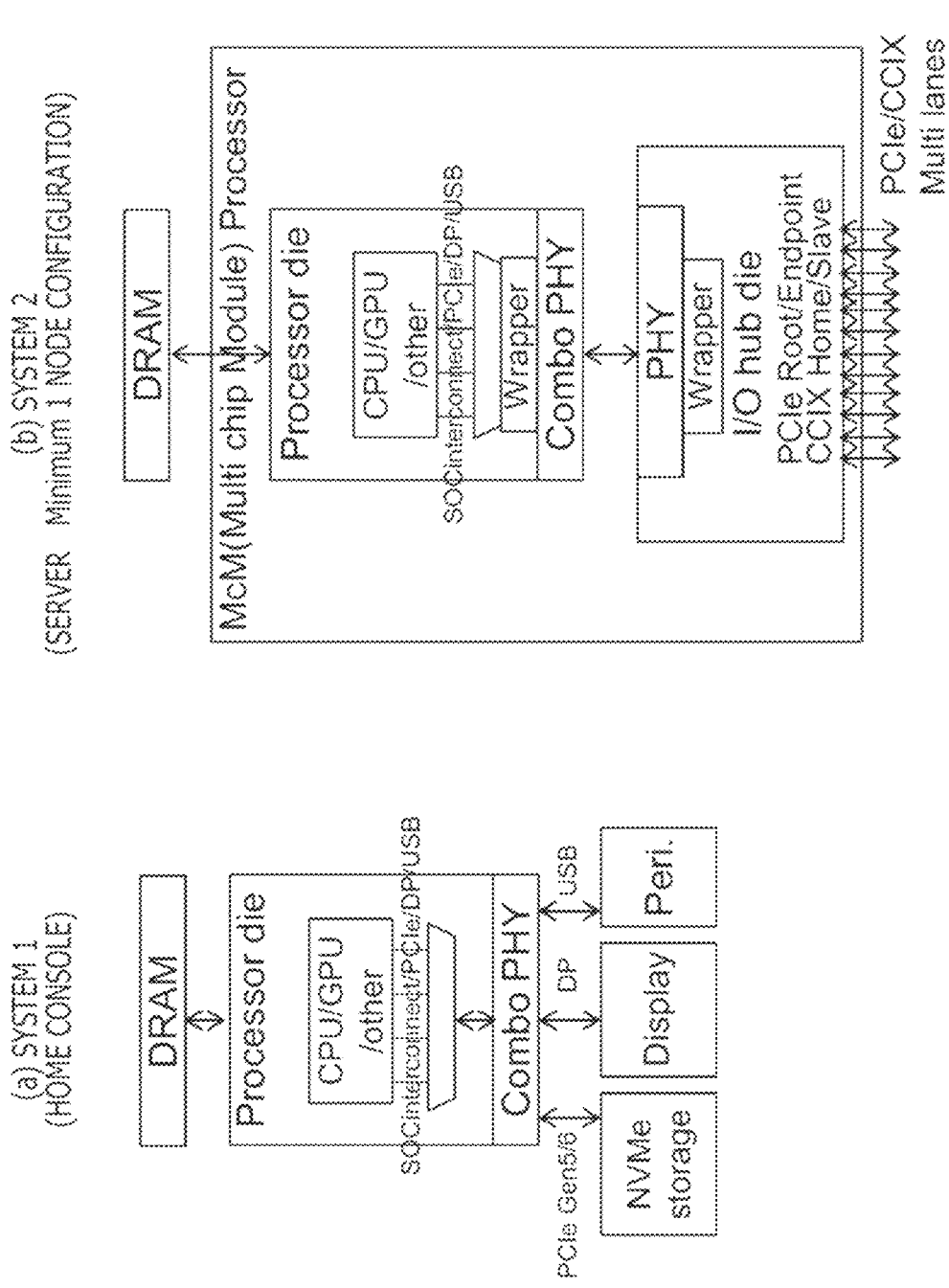
FIG. 36 is a further explanatory diagram illustrating an exemplary GPU configuration method of the embodiment of the present invention.

In addition, as exemplified in FIG. 36, with the use of a silicon die (processor die) that functions as the signal processing chip of the present embodiment, a relatively small-scale home console (FIG. 36(a)) or a relatively large-scale server (FIG. 36(b)) can also be realized. Although the common silicon die is used in this example, in the home console, which has no chip-to-chip interconnect, the wrapper module included in the silicon die is not used (not enabled). Meanwhile, in the server, the wrapper module is enabled, and a multi-chip connection is made. In the example of FIG. 36(b), the wrapper module is connected to an I/O hub die.

In addition, in a case where a processor die includes a plurality of wrapper modules, depending on the scale of a system to be configured, the number of wrapper modules to be enabled may be changed (FIG. 37).

Note that, as exemplified in FIG. 30 to FIG. 37 and the like, when a plurality of chip-to-chip interconnects are included, some of them may be chip-to-chip interconnects other than the interconnect using the signal processing chip of the present embodiment (interconnects utilizing no wrapper module).

REFERENCE SIGNS LIST

1: Signal processing chip
10: Wrapper section
11: Sampling section
12, 12': Transmission section
13, 13': Reception section
14, 14': Inverse sampling section
21: Identification information table
22: Identification information adding section
23: Identification information decoding section

The invention claimed is:
1. A signal processing chip comprising:
a plurality of signal processing blocks each configured to transmit and receive a signal via a signal line;
sampling means for sampling the signal on the signal line that is transmitted and received by the signal processing blocks; and transmission means for transmitting, to another signal processing chip, a data frame including information indicating the signal sampled at a timing of satisfying a predetermined condition; wherein the sampling is performed with a predetermined scheme irrespective of on-chip interconnect protocols of the signal processing chip and on-chip interconnect protocols of the another signal processing chip; and the predetermined scheme optimizes voltage amplitude.

2. The signal processing chip according to claim 1, wherein the transmission means includes a buffer configured to hold the data frame obtained by sampling until the timing satisfying the predetermined condition comes.

3. The signal processing chip according to claim 1, wherein the timing satisfying the predetermined condition for the transmission means includes a time point at which a given instruction is received from the another signal processing chip serving as a transmission destination of the information.

4. The signal processing chip according to claim 1, wherein the signal line includes a data signal line for allowing the signal processing blocks to transmit and receive data and a control signal line for allowing the signal processing blocks to transmit and receive control information.

5. The signal processing chip according to claim 1, wherein the sampling means performs sampling at at least one of the following time points:
(1) when there is a change in signal on the signal line that is sampled;
(2) when a control signal indicating a status of each of the signal processing blocks and/or the signal line indicates a given status; and
(3) when the status of the signal line that is sampled becomes a given status, and the transmission means transmits, at the timing satisfying the predetermined condition, the data frame obtained by sampling by the sampling means to the another signal processing chip.

6. The signal processing chip according to claim 1, wherein
the transmission means includes transmission means for generating at least one transfer frame having a predetermined data length on a basis of a plurality of the data frames and transmitting the transfer frame, and,
in generating the transfer frame, information included in at least one of the data frames is packed into a plurality of the transfer frames in accordance with a predetermined packing rule, to thereby generate the transfer frame.

7. The signal processing chip according to claim 1, wherein the transmission means generates a transfer frame including the data frame and data indicating a boundary between data frames and transmits the transfer frame.

8. The signal processing chip according to claim 1, wherein the data frame includes the signal on the signal line that is transmitted and received by the plurality of signal processing blocks and/or information obtained by sampling the signal at a plurality of time points different from each other.

9. The signal processing chip according to claim 1, wherein
the sampling means samples signals to be received by a respective plurality of signal processing blocks serving as destinations in the another signal processing chip serving as a transmission destination, and
the transmission means further generates the data frame by rearranging the information obtained by sampling in an order determined in advance with regard to the plurality of signal processing blocks serving as the destinations, and transmits the data frame to the another signal processing chip at the timing satisfying the predetermined condition.

10. The signal processing chip according to claim 1, wherein the transmission means further adds, to the data frame indicating the signal sampled, identification information for identifying a signal processing block in the another signal processing chip that is to receive the signal sampled, and transmits the data frame to the another signal processing chip at the timing satisfying the predetermined condition.

11. The signal processing chip according to claim 1, wherein the transmission means further adds, to the data frame indicating the signal sampled, identification information for identifying a pair of a signal processing block that has output the signal sampled and serves as a source and a signal processing block that is to receive the signal and serves as a destination in the another signal processing chip, and transmits the data frame to the another signal processing chip at the timing satisfying the predetermined condition.

12. The signal processing chip according to claim 1, wherein
the sampling means operates in a plurality of operation modes including a fixed cycle mode, and, when operating in the fixed cycle mode, the sampling means successively samples, in a given clock cycle, signals on the signal line that are transmitted and received by the signal processing blocks, and
the transmission means transmits a data frame including information indicating the signals successively sampled, without interruption.

13. A signal processing chip including a plurality of signal processing blocks connected to each other by a signal line,
the signal processing chip being connected to another signal processing chip including a plurality of signal processing blocks connected to each other by a signal line,
the signal processing chip comprising:
reception means for receiving, from the another signal processing chip, a data frame indicating a signal on the signal line between the signal processing blocks in the another signal processing chip, the signal having been sampled in the another signal processing chip; and
inverse sampling means for outputting a signal to the signal line of the signal processing chip on a basis of the data frame received; wherein
the sampling is performed with a predetermined scheme irrespective of on-chip interconnect protocols of the signal processing chip and on-chip interconnect protocols of the another signal processing chip; and
the predetermined scheme optimizes voltage amplitude.

14. The signal processing chip according to claim 13, wherein
the reception means receives the data frame with identification information for identifying a signal processing block that is to receive the signal output from the inverse sampling means on a basis of the data frame and serves as a destination, and
the signal processing chip further includes switch means for supplying, to the signal processing block identified by the identification information as the destination, the signal output from the inverse sampling means.

15. The signal processing chip according to claim 13, wherein
the reception means receives the data frame with identification information for identifying a pair of a signal processing block that has output the signal sampled in the another signal processing chip and serves as a source and a signal processing block that is to receive the signal output from the inverse sampling means on a basis of the data frame and serves as a destination, and the signal processing chip further includes switch means for supplying, to the signal processing block identified by the identification information as the destination, the signal output from the inverse sampling means.

16. The signal processing chip according to claim 14, wherein the identification information is held in association with format information regarding a sampling format, and the signal output from the inverse sampling means on a basis of the data frame with the identification information is supplied, as a signal in a format indicated by the format information held in association with the identification information, to the signal processing block identified by the identification information as the destination.

17. A signal processing system including a plurality of signal processing chips each including a plurality of signal processing blocks connected to each other by a signal line, a first signal processing chip corresponding to at least one of the signal processing chips including at least sampling means for sampling a signal on a first signal line between the signal processing blocks in the first signal processing chip, and transmission means for transmitting, to another signal processing chip, a data frame including information indicating the signal sampled at a timing of satisfying a predetermined condition, a second signal processing chip different from the first signal processing chip including at least reception means for receiving, from the first signal processing chip, the data frame including the information regarding the signal on the first signal line between the signal processing blocks in the first signal processing chip, the signal having been sampled in the first signal processing chip, and inverse sampling means for outputting a signal to a second signal line in the second signal processing chip on a basis of the data frame received; wherein the sampling means samples the signal on the first signal line with a predetermined scheme irrespective of a protocol that is used by one of the signal processing blocks in the first signal processing chip when transmitting and receiving the signal to and from another of the signal processing blocks in the first signal processing chip via the first signal line;

the transmission means transmits the data frame with the predetermined scheme irrespective of the protocol; and the predetermined scheme optimizes voltage amplitude.

18. The signal processing system according to claim 17, wherein the sampling means samples the signal on the first signal line with a predetermined scheme irrespective of a protocol that is used by one of the signal processing blocks in the first signal processing chip when transmitting and receiving the signal to and from another of the signal processing blocks in the first signal processing chip via the first signal line, and the transmission means transmits the data frame with the predetermined scheme irrespective of the protocol.

* * * * *